United States Patent [19]

Kulicke, Jr. et al.

[11] 3,738,560

[45] June 12, 1973

[54] SEMICONDUCTOR DIE BONDER

[75] Inventors: Frederick W. Kulicke, Jr.; John J. Lepone, both of Philadelphia, Pa.

[73] Assignee: Kulicke and Soffa Industries, Inc., Fort Washington, Pa.

[22] Filed: Dec. 8, 1970

[21] Appl. No.: 96,213

[52] U.S. Cl. .............. 228/10, 29/203 P, 29/203 V, 219/79, 228/49

[51] Int. Cl. .............................................. B23k 1/14

[58] Field of Search ..................... 156/556; 219/78, 219/79, 85; 228/3, 4, 49, 5, 6, 10; 29/203 R, 203 P, 203 V

[56] References Cited

UNITED STATES PATENTS

| | | | |
|---|---|---|---|
| 3,050,617 | 8/1962 | Lasch, Jr. et al. | 219/85 |
| 3,051,026 | 8/1962 | Costa | 78/82 |
| 3,125,906 | 3/1964 | Johnson | 228/4 |
| 3,192,358 | 6/1965 | Lasch, Jr. et al. | 228/3 UX |
| 3,442,432 | 5/1969 | Santangini | 228/44 |

*Primary Examiner*—J. Spencer Overholser
*Assistant Examiner*—Robert J. Craig
*Attorney*—Roger S. Borovoy and Alan H. MacPherson

[57] ABSTRACT

In a die bonder for use in bonding semiconductor dice to bonding pads, a plurality of dice to be bonded to bonding pads are placed in a first horizontal plane on a movable pedestal beneath a second horizontal plane in which the bonding pads are located. A die is picked up and transferred from a holding tray on the pedestal in the first horizontal plane to a bonding pad properly positioned in the second horizontal plane. The die to be picked up is properly located by placing it in a light beam from a spotlight. The bonding pad is contained on a support structure — typically a lead frame strip — which is automatically indexed along a heating rail such that once each cycle of machine operation a bonding pad is properly positioned to receive a die. The structure for picking up and transferring the die and the structure for moving the support structure along the heating rail are powered through five cams mounted on a single shaft which in turn is driven by a motor. The motor is shut off twice each bonding cycle for a selected but variable period of time to allow the bonding rate of the machine to be adjusted to operator proficiency.

13 Claims, 37 Drawing Figures

INVENTORS
FREDERICK W. KULICKE JR.
JOHN LEPONE

INVENTORS
FREDERICK W. KULICKE JR
JOHN LEPONE

INVENTORS
FREDERICK W. KULICKE JR
JOHN LEPONE

INVENTORS
FREDERICK W. KULICKE JR.
JOHN LEPONE

INVENTORS
FREDERICK W. KULICKE JR.
JOHN LEPONE

INVENTORS
FREDERICK W. KULICKE JR.
JOHN LEPONE

INVENTORS
FREDERICK W. KULICKE JR.
JOHN LEPONE

INVENTORS
FREDERICK W. KULICKE JR
JOHN LEPONE

INVENTORS
FREDERICK W. KULICKE JR
JOHN LEPONE

INVENTORS
FREDERICK W. KULICKE JR
JOHN LEPONE

INVENTORS
FREDERICK W. KULICKE JR.
JOHN LEPONE

INVENTORS
FREDERICK W. KULICKE JR.
JOHN LEPONE

INVENTORS
FREDERICK W. KULICKE JR.
JOHN LEPONE

INVENTORS
FREDERICK W. KULICKE JR.
JOHN LEPONE

SEMICONDUCTOR DIE BONDER

BACKGROUND OF THE INVENTION

1. Field of the Invention

This invention relates to semiconductor die bonders and in particular to a die bonder capable of bonding semiconductor dice to lead frames at a high rate of speed.

2. Prior Art

Semiconductor die bonders are used to attach semiconductor dice to support structures such as ceramic substrates or bonding pad areas on metal lead frames. Typically, to bond a die to a support structure, the support structure is heated and the semiconductor die is placed on this structure. A eutectic or other alloy on the back of the die melts after contact with the heated support structure and upon cooling, forms a bond between the die and the support structure. Because pressure is usually applied to the die to assist in forming a strong bond between the die and the support structure, this type of bonder is called a thermocompression bonder.

In another type of die bonder, the die, once placed on the heated support structure, is agitated back and forth by ultrasonic energy. The ultrasonic energy assists in melting the eutectic and thus speeds up the bonding operation.

In both ultrasonic bonding and thermocompression bonding, time elapses before the eutectic or alloy on the bottom of the die heats sufficiently to bond the die to the support structure. This time limits the rate at which bonds can be formed. Another limitation on this rate is the time required to pick up each die from a tray and transfer it to the support structure. A variety of mechanisms — including one using two die pickup needles oriented 180° apart on a support arm — have been proposed to carry out this transfer. Many suffer from the fact that as the size of the wafers from which the dice are broken increases, the distance which the die pick-up needle must travel from the dice tray to the support structure—both located in the same plane—increases.

SUMMARY OF THE INVENTION

This invention overcomes some of the limitations of the prior art die bonders by providing a die bonder capable of bonding semiconductor dice to support structures (hereafter called substrates) at an adjustable and rapid rate, typically on the order of one per second. The structure of this invention operates continuously unless interrupted by the operator. The dice tray is located in a plane different from the plane in which the substrates are located thus decreasing the distance which the die pick-up needle must travel between the dice tray and the substrates to which the dice are bonded.

According to this invention, a die bonder comprises a die pick-up needle, structure for moving this needle simultaneously in the horizontal and vertical directions together with heating and indexing structure for heating, and automatically locating in the die bonder, substrates to which the dice are to be bonded. Dice broken from a wafer are contained on an easily movable dice tray. A light beam defines that die in the proper position on the tray for the pick-up needle.

As the die pick-up needle comes down on the illumined die, a vacuum is drawn on the needle thereby holding the die on the end of the needle. In one embodiment, the needle has a flat face with a hole in the face through which a vacuum is drawn so as to pull a die to the needle's face. However, a variety of different needle types can be used with this invention. The needle then is driven simultaneously upward and toward the properly-located substrate to which the die is to be bonded. This substrate has previously been slid along a heater rail and heated to a temperature sufficient to melt the eutectic on the bottom of the die. The pick-up needle automatically comes down on top of the substrate, and the vacuum on the needle is released after the die has contacted the substrate. The needle — weighted by removable weights — is held momentarily on the die while the eutectic on the back of the die rapidly heats up toward the temperature of the substrate. The needle then is lifted automatically from the die and returned to the dice tray to pick up another die which in the interim has been moved by the operator into the light beam. Simultaneously, an indexing mechanism moves a new substrate into position on the heater rail to receive the next die and removes the substrate to which a die was just bonded from the bonding position.

Lead frame strips containing substrates to which dies are to be bonded are contained in a carrier adjacent the heater rail. As each strip moves from the carrier into a slot adjacent the heater rail, the carrier is indexed one position to bring into line with the slot the next lead frame strip in the carrler. As each lead frame strip the die bonder, it moves into a corresponding slot in a second carrier.

The operation of the die bonder of this invention is continuous, the operator having only to locate each die to be bonded in the light beam. The operator views the die through a microscope and can, in an emergency, stop the bonding operation by releasing a button on the side of the die tray pedestal.

As a feature of this invention, a timing circuit is provided by which the drive motor driving the die pick-up needle is automatically stopped a selected number of times each bonding cycle. Each time the motor is stopped, it remains off for a time controlled by an adjustable timer in the control circuitry. Then the motor automatically restarts so long as the operator has the button on the side of the die tray pedestal pressed. By adjusting the off time, the die bonding rate of the machine is adjusted to be compatible with an operator's ability.

All mechanical motions of the die bonder are obtained from cams on one shaft. A slotted disc connected to this shaft actuates a photo cell which drives a counter to indicate the total number of bonds produced by the device. A rotary valve on the camshaft controls the application and removal of vacuum to and from he die pick-up needle. During the bonding operation, the lead frame strip is clamped in position adjacent the heater rail. After each bond, index fingers in the indexing assembly are withdrawn from the strip and moved back along the strip one substrate distance before again engaging the lead frame strip to advance the next substrate into bonding position.

The die bonder of this invention achieves high speed operation by placing the dice tray from which die are obtained in a first plane beneath the heating and indexing assembly while the substrates or bonding pads on the lead frame strip to which the dice are bonded are held in a second plane. Thus the distance travelled by the die pick-up needle is independent of the wafer diameter. An air bearing supports the arm on which the die pick-up needle is mounted. In addition, the pick-up needle itself floats on air inside a cylindrical bearing. The arm on which the pick-up needle is mounted rotates about and slides along a vertical shaft at the end opposite the pick-up needle. By rotating and raising this arm, the needle itself is driven through a simultaneous vertical and radial movement to transport each die from the dice tray to the substrate.

A vertical lead frame strip containing a plurality of horizontal substrates or bonding pads to which the dice are bonded is used in the bonder of this invention. Use of a vertical rather than a horizontal strip as in the prior art, simplifies the clamping of the strip just prior to die bonding and makes easier the handling and storage of the resulting strips before, during and after the die bonding operation. The vertical lead frame strip allows all dice to be visually inspected after the strips on which they are mounted are placed side by side in a carrier.

DETAILED DESCRIPTION

The detailed description of specific structures does not preclude the use of equivalent structures, not described, in the die bonder of this invention.

Figure 1:
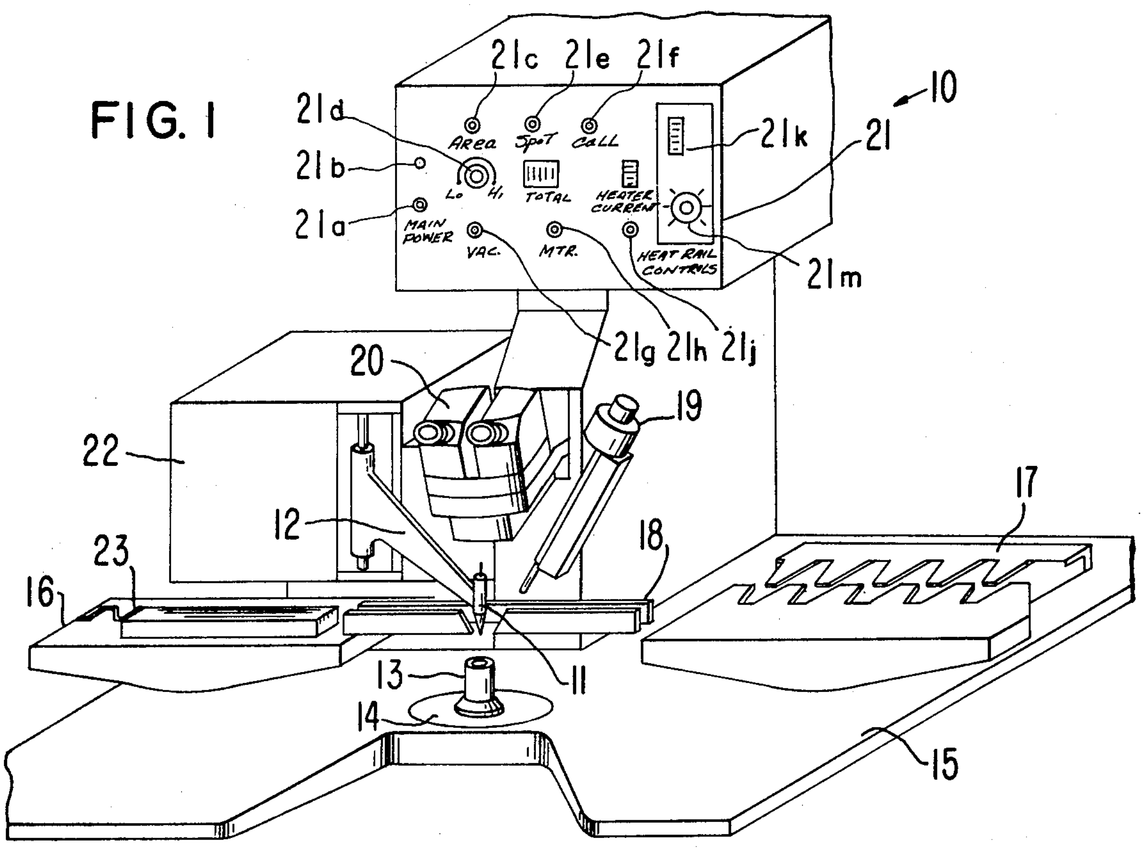
FIG. 1 shows schematically an isometric view of the die bonder of this invention.
Figure 2A:
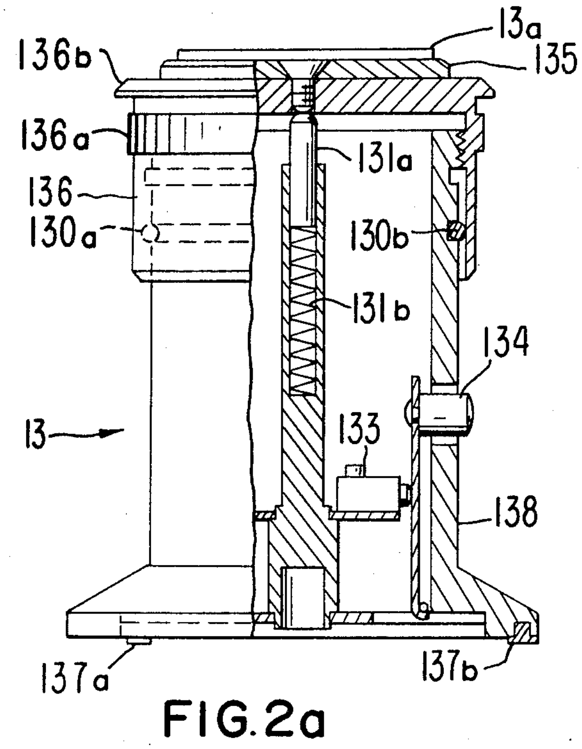
FIGS. 2*a* and 2*b* show partially cross-sectional side and plan views of the dice dish pedestal used to carry the dice tray.
Figure 2B:
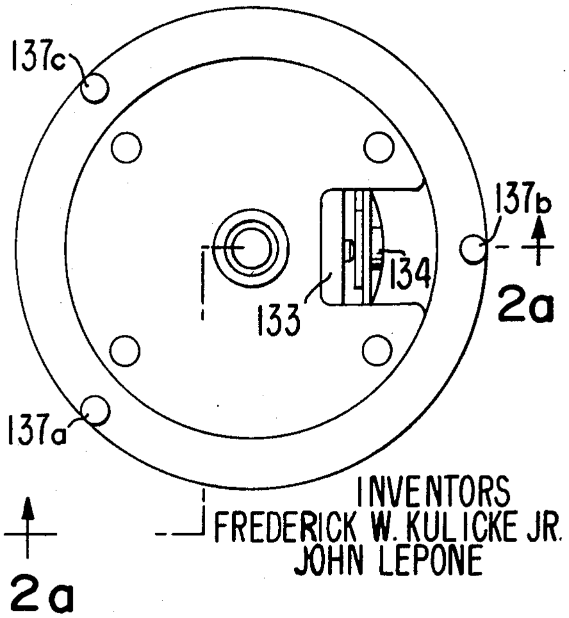

FIG. 1 shows an isometric view of the die bonder of this invention. A tray 13*a* (FIG. 2*a*), containing individual dice broken from a semiconductor wafer, is placed on the top of dice dish assembly 13. Resting on pads made of smooth material such as a Teflon coated metal, dice dish assembly 13 can be easily moved over the smooth surface of dice dish assembly pad 14 by an operator. A button (not shown in FIG. 1) on the back side of the dice dish assembly 13, when pressed, initiates operation of the die bonder. The die bonder operates continuously so long as the button remains pressed, completing bonding cycle after bonding cycle without interruption. A timing circuit within the bonder allows the machine's bonding rate to be adjusted to the proficiency of the operator. Dice dish assembly pad 14, is located on base 15, the outside flanges of which serve as an arm rest for the operator.

When the operator presses the button on the back of dice dish assembly 13, die pick-up needle 11 comes down on top of a particular die located within a beam of light produced by spotlight 19. The operator views this die through microscope 20, of a well-known design, and ensures the proper orientation of the die by rotating dice dish assembly 13 so as to locate properly within the center of the beam from spotlight 19 the die to be picked up.

Die bonder head assembly 11 contains a vacuum pick-up needle which comes down on top of the die. The needle, together with its support mechanism will hereafter be called the die pick-up head. The needle contains an interior channel attached to a source of a vacuum. That portion of the needle which comes down on top of the die has a flat face and thus has a smooth contacting surface. When the needle is properly located with respect to a die, a vacuum is automatically drawn on the needle thereby holding the die to the needle. Bonder arm 12 is then driven by cam and drive linkage (FIGS. 6*a*, 6*c*) contained within power unit 22 simultaneously upward and horizontally toward the bonding pad on the lead frame strip to which the die is to be bonded. The lead frame strip (not shown in FIG. 1) is automatically indexed along a heat rail by an indexing mechanism contained within lead frame strip heating and indexing assembly 18. Bonder arm 12 is driven such that needle 11 holding the die terminates its horizontal motion just above a selected bonding pad in a group of leads attached to a properly positioned lead frame strip. Bonding arm 12 then lowers allowing needle 11 to approach the bonding pad. After the die carried on the needle contacts the bonding pad, the needle vacuum is released allowing the die to remain on the bonding pad. The eutectic or other alloy on the bottom of the die melts as a result of the prior heating of the bonding pad and the die is pressed against the bonding pad by the weight of the needle thereby bonding the die to the pad. Arm 12 then rises slightly, removing the needle from the die. Arm 12 then moves horizontally back toward dice dish assembly 13 and vertically drops so that needle 11 will pick up the next die which the operator has positioned in the beam of spotlight 19 while the previous die was being bonded. Simultaneously with this motion, indexing assembly 18 moves the lead frame strip one position further along the heating rail thereby removing from contact with the heating rail the lead group containing the bonding pad to which the die was just bonded and bringing into proper position for the next bonding operation the bonding pad in the next following lead group attached to the lead frame strip.

Lead frame strips containing groups of leads, each group containing one bonding pad, are carried in lead frame carrier 23. The lead strip used with this invention is of a unique design such that the strip itself is held in a vertical position while the bonding pad to which the die is attached remains horizontal. A plurality of frame strips are carried in vertical slots in carrier 23, each slot receiving one lead frame. A typical lead frame strip contains 50 groups of leads and thus fifty bonding pads. However, lead frame strips containing greater or lesser numbers of groups of leads can, of course, be used with this invention. Lead frame strip carrier 23 is placed on load carrier deck 16 in such a manner that the first lead frame strip in the carrier lines up with a slOt in the lead frame heating and indexing assembly 18. The operator manually moves the lead frame strip from the lead frame carrier 23 into the slot in heating and indexing assembly 18. Heating and indexing assembly 18 then automatically advances the lead frame strip one unit per cycle so that one bonding pad is always available for receiving a die. After all the bonding pads on a given lead frame strip receive dies, the operator moves the lead frame strip carrier 23 perpendicularly to the lead frame strip heating and indexing assembly 18 thereby aligning the next lead frame strip in carrier 23 with the slot in lead frame strip heating and indexing assembly 18. As the new lead frame strip is advanced into the slot, the lead frame strip previously contained within this slot is pushed into a carrier (not shown-)—identical to lead frame strip carrier 23—placed on unload carrier deck 17.

The die bonder of this invention is driven by a power unit 22 containing one motor connected to a single drive shaft (FIG. *6a*) with a plurality of cams located thereon. These cams are connected by rollers and drive linkages to the appropriate actuating mechanisms of the bonder. Two cams impart the simultaneous horizontal and vertical motions to bonder arm 12. A third cam slides the lead frame strip contained within lead frame strip heating and indexing assembly 18 along the heat rail and a fourth cam locks the lead frame strip contained in assembly 18 in position during the actual die bonding operation. Another cam rotates the indexing mechanism about a horizontal axis so as to insert prongs or fingers into holes in the lead frame strip prior to the sliding of the lead frame strip along the heat rail. Thus two cams are used to transfer the dice from the dice dish assembly 13 to the bonding pads while three cams are used to index and clamp the lead frame strip to which the dice are being bonded.

In addition to the actual operating mechanisms briefly described above, the die bonder has a display panel which gives such information as pressures, temperatures of gases, the number of bonds carried out by the die bonder and which contains switches for turning on and off the drive motor and other electrical circuits associated with the die bonder.

Each section of the die bonder will now be described in detail. The following description is exemplary only and is not to be construed as limiting the invention to solely the embodiment described.

Dice Dish Assembly 13

FIGS. *2a* and *2b* show side and top views of dice dish assembly 13. FIG. *2a*, a side view, is partially cross-sectioned to show the height-adjusting mechanism used to compensate for different wafer thicknesses. Dice dish assembly 13 contains base 138 resting upon pads 137*a* through 137*c*. Pads 137 are designed to move easily over pad surface area 14 (FIG. 1) and typically are of a material such as Teflon coated metal. Pedestal 138 is essentially a hollow cylinder. Threadably mounted on the top of base 138 is cylindrical top piece 136, the inside diameter of which varies, but which at its smallest is slightly larger than the largest outside diameter of pedestal 138. The inside diameter of cap 136 increases abruptly part way toward the bottom of this cap. O-ring 130*a* is placed in slot 130*b* in the outside surface of pedestal 138. O-ring fits snugly in this slot and presses firmly on the inside surface of cap 136. Pressing up on the center portion of the top plate 136*b* of cap 136 is a rod 131*a* driven by spring 131*b*. Spring 131*b* together with rod 131*a* ensures that at all times play is taken out of the threads between top 136 and base 138. Teflon ring 130*a* on the other hand provides friction to maintain any pre-set adjustment. To adjust the height of cap 136 the operator rotates cap 136 by placing his fingers on raised portion 136*a* and screwing parts 136 and 138 together or apart. The cap remains in its new position due to the combined forces applied to it by spring 131*b* and O-ring 131*a*.

A tray 13*a* containing dice broken from a wafer is shown schematically on the top of cap 136. To correctly position the proper die, the operator looks through a microscope 20 (FIG. 1) and moves base 138 until the die to be bonded is centered within the light from spotlight 19 (FIG. 1). Base 138 slides easily on pads 137*a*, 137*b* and 137*c* and thus this centering is done rapidly and nearly effortlessly. The operator continuously presses button 134 which activates microswitch 133. This ensures that the die pick-up needle continuously cycles from tray 13*a* where it picks up a die to the lead frame strip to which the dice are being bonded. To stop the bonding operation, as is necessary to place a new lead frame strip in position or to place a new tray of dice on cap 136, the operator merely releases button 134.

Bonder arm assembly and pick-up needle

FIGS. *3a* through *3c* show the bonder arm assembly and pick-up needle in top, side and cutaway views. Bonder arm 120 (FIG. *3a*) connects pick-up needle 125 mounted on one end of bonder arm 120 to bonder arm shaft 121*a*. Bonder arm 120, which in one embodiment is a solid piece of cast aluminum, contains on one end thereof annular bearing section 121*b*. This permits bonder arm 120 to rotate about and slide along bonder arm shaft 121*a*. Shaft 121*a* is securely fastened in V-mounts to the die bonder frame. Bearing section 121*b* has a cylindrical inside surface containing thereon two porous bronze bearing 121*e* and 121*f*. Air under pressure is pumped through openings 121*c* and 121*d* into annular chambers 121*g* and 121*h* in these bearings and from these chambers forced through these bronze bearings to the annular space between the inside surface of these bearings and shaft 121*a*. This ensures a smooth, low friction contact between shaft 121*a* and bearings 121*e* and 121*f*. Thus arm 120 can easily be made to rotate about, and move along, shaft 121*a*.

Arm 120 is rotated about shaft 121*a* by means of forces applied to roller 123*d*. Roller 123*d* is rotatably mounted on pointed bearings 123*e* and 123*f* which in turn are threadably mounted in two cantilevered extensions of support arms 123*a* and 123*b*. Bearings 123*e* and 123*f* also serve as adjustment screws for adjusting the height of roller 123*d*. Arms 123*a* and 123*b* are held a fixed distance apart by spacer 123*c* and are formed integrally with, and supported by, annular bearing section 121*b*. Arm 120 is rotated in the horizontal direction by forces applied to roller 123*d* in the direction shown by arrows 127*a* and 127*b* (See FIGS. *3a*, *6a* and *6d*), and by spring 306 (FIG. *6a*).

Pick-up needle 125 is rigidly attached to one end of bonder arm 120. As shown in FIG. *3b*, the vertical axis of pick-up needle 125 is parallel to the vertical axis of shaft 121*a*. The pick-up needle itself comprises a pick-up spindle 125*h* (FIG. *3c*) which is slideably mounted within a cylindrical bearing 125*j*. An opening 125*a* allows air under pressure to be pumped through passageway 125*f* thereby to create an air film between the inside surface of bearing 125*j* and the outside surface of spindle 125*h*. The air flows through the annular space 125*g* between pick-up spindle 125*h* and the inner surface of bearing 125*j* and exits from this annular space at either end of this space. This air ensures that spindle 125*h* moves freely up and down inside bearing 125*j*. Inside spindle 125*h* is channel 125*k* connected to vacuum line 125*b*. Attached to the other end of channel 125*k* is due pick-up head 125*l*. Head 125*l* is shown in more detail in FIG. 3*d*. Head 125*l* contains support seat 125*m* threadably attached to pick-up spindle 125*h*. Support seat 125*m* contains vacuum chamber 125*p* connected to channel 125*k*. Attached to seat 125*m* is tool holder support 125*n*. Placed in the bottom of tool holder support 125*n* is tool holder 125*q*. Set screw 125*t* holds capillary 125*s* in proper position at the bottom of holder 125*q*. Die tube 125*r* containing a channel for passage of vacuum, connects a passage in the bottom of support seat 125*m* to the vacuum passage through the middle of capillary 125*s*. Tool holder 125*q* has a flat surface so that the position of capillary 125*s* can be observed in holder 125*q*. A die to be bonded is picked up by capillary 125*s* when vacuum is applied to line 125*b* and thus through chamber 125*p* and the channels in die tube 125*r* and capillary 125*s*.

Spindle 125*h* floats up and down within bearing 125*j* allowing pick-up head 125*l* to drop down onto the die and then rest on the die while bearing 125*j* follows the vertical motion dictated by the cams which drive bonder arm 120. Because spindle 125*h* floats freely at least through the distance *d*, only the weight of spindle 125*h* and any associated added weights 125*d* rest on the semiconductor die contained within cavity 125*i*. The distance *d* is adjusted by pick-up height adjusting screw 125*c*. On the top of spindle 125*h* is placed weight 125*d*. This weight slides over weight seat 125*e*. Typical weights used vary up to 20 grams, although heavier weights can be used if desired.

Figure 3A:
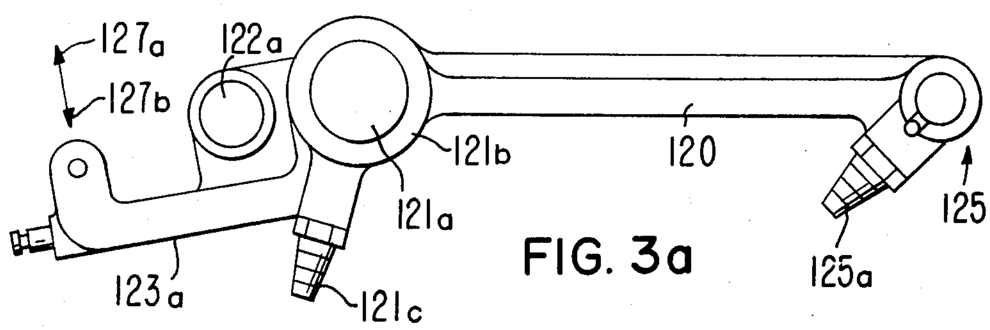
FIGS. 3*a*, 3*b*, 3*c* and 3*d* show top, side and partial cross-sectional views of the bonder arm assembly used to carry the die pick-up needle from the dice tray to the lead frame strip bonding pad area.
Figures 3B, 3C, 3D, 4C:
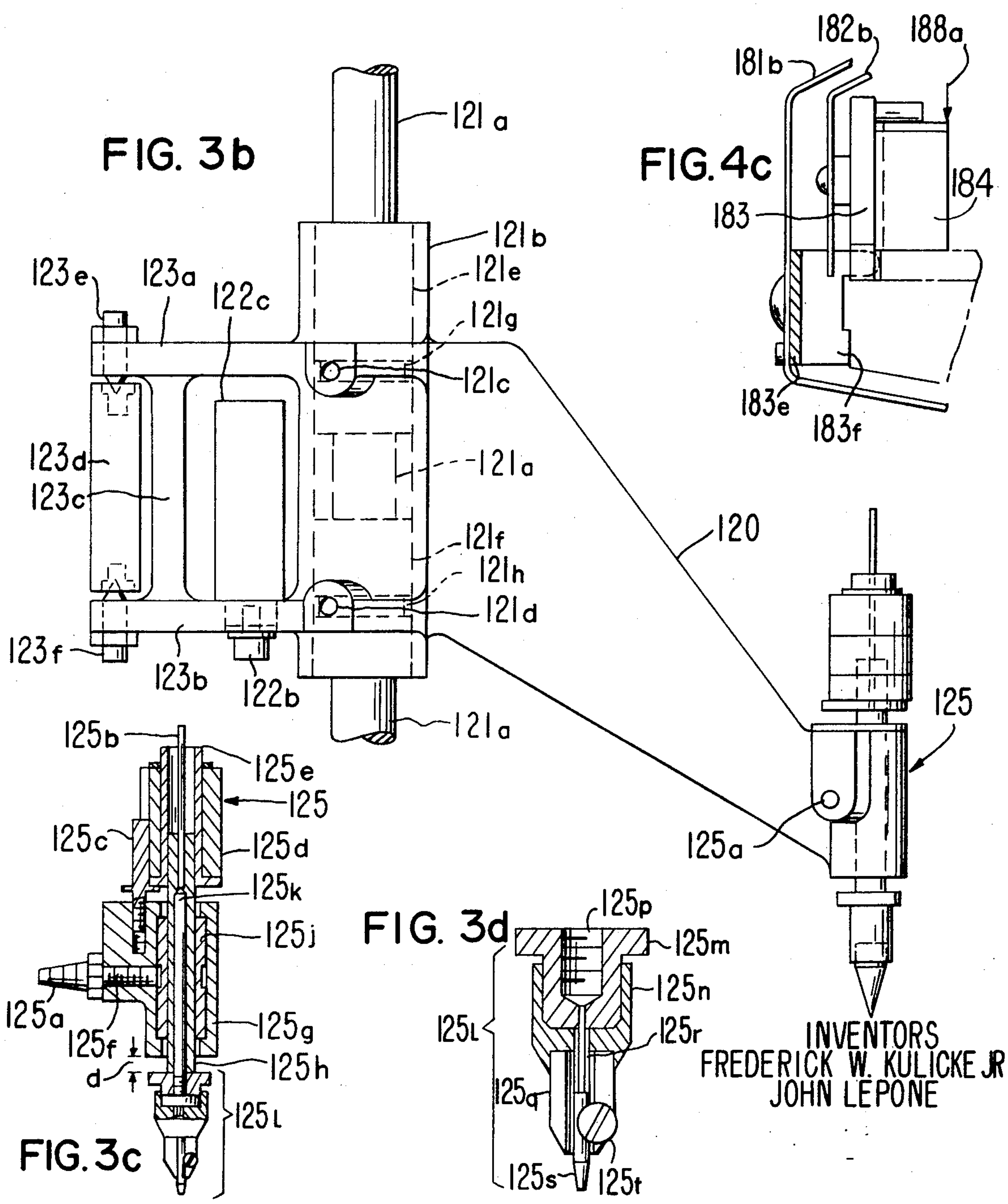
FIGS. 4*a*, 4*b*, 4*c* and 4*d* show top, front and two side views of the heat rail assembly used to heat the lead frame strip containing the bonding pads to which the dice are to be attached.
Figure 6E:
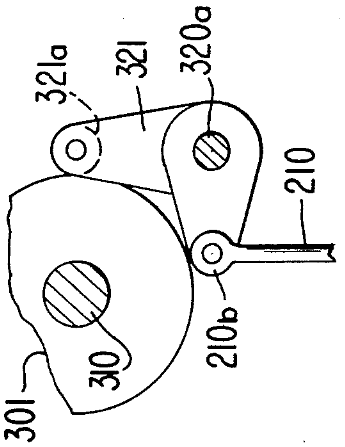
FIGS. 6*a* through 6*f* show the arrangement of the motor, cams, single cam shaft and drive linkages.
Figure 6F:
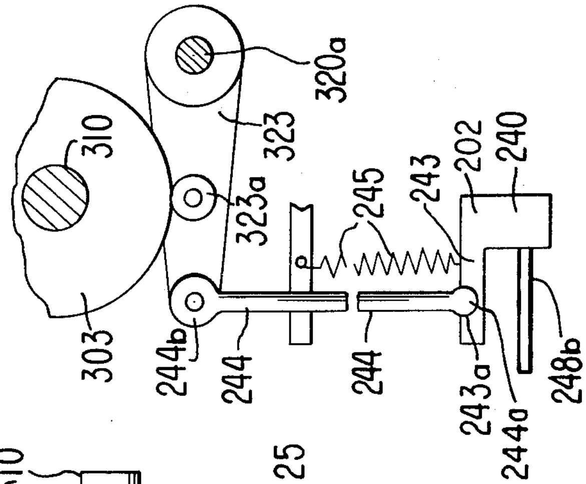
Figure 6B:
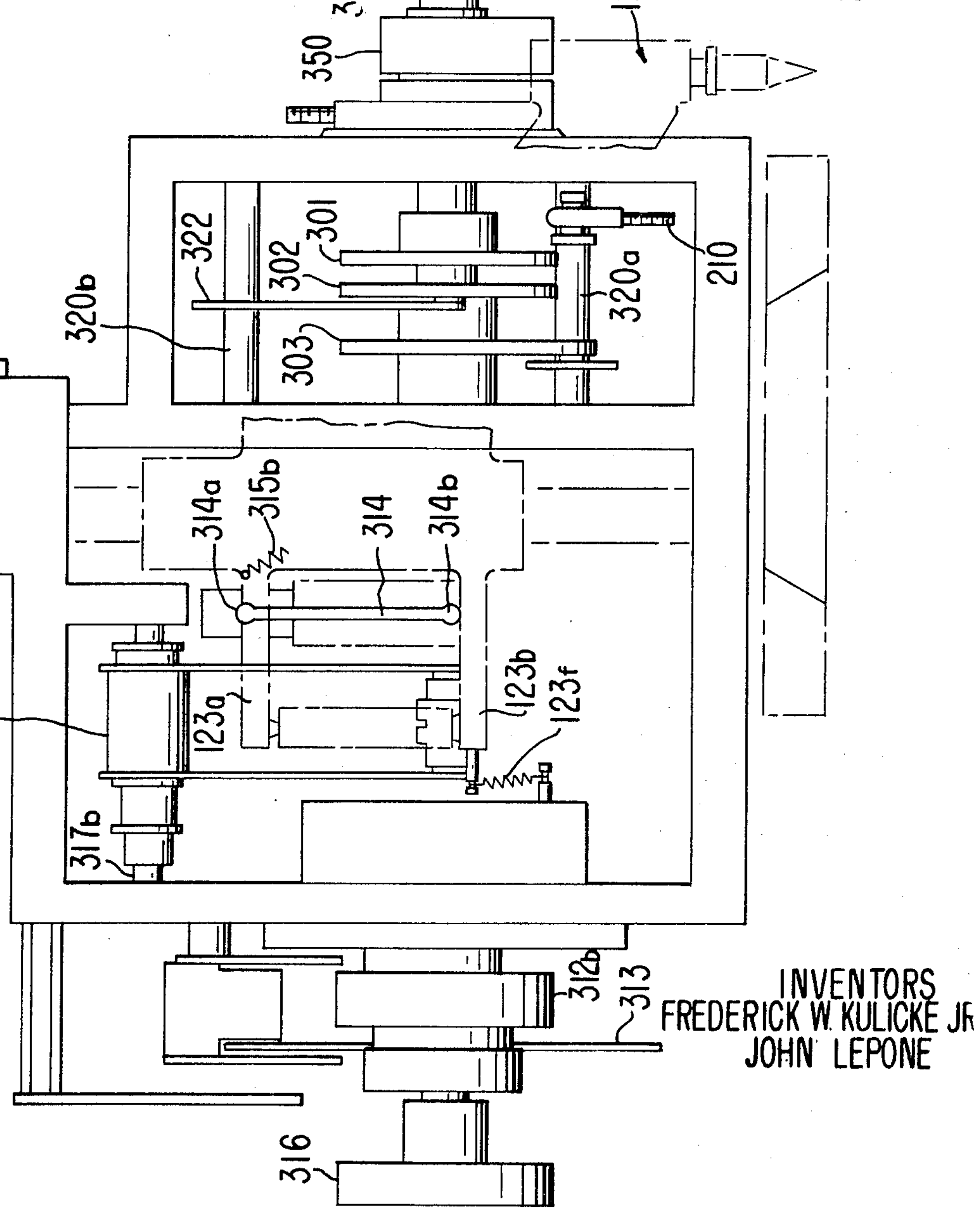
Figures 6A, 6C, 6D:
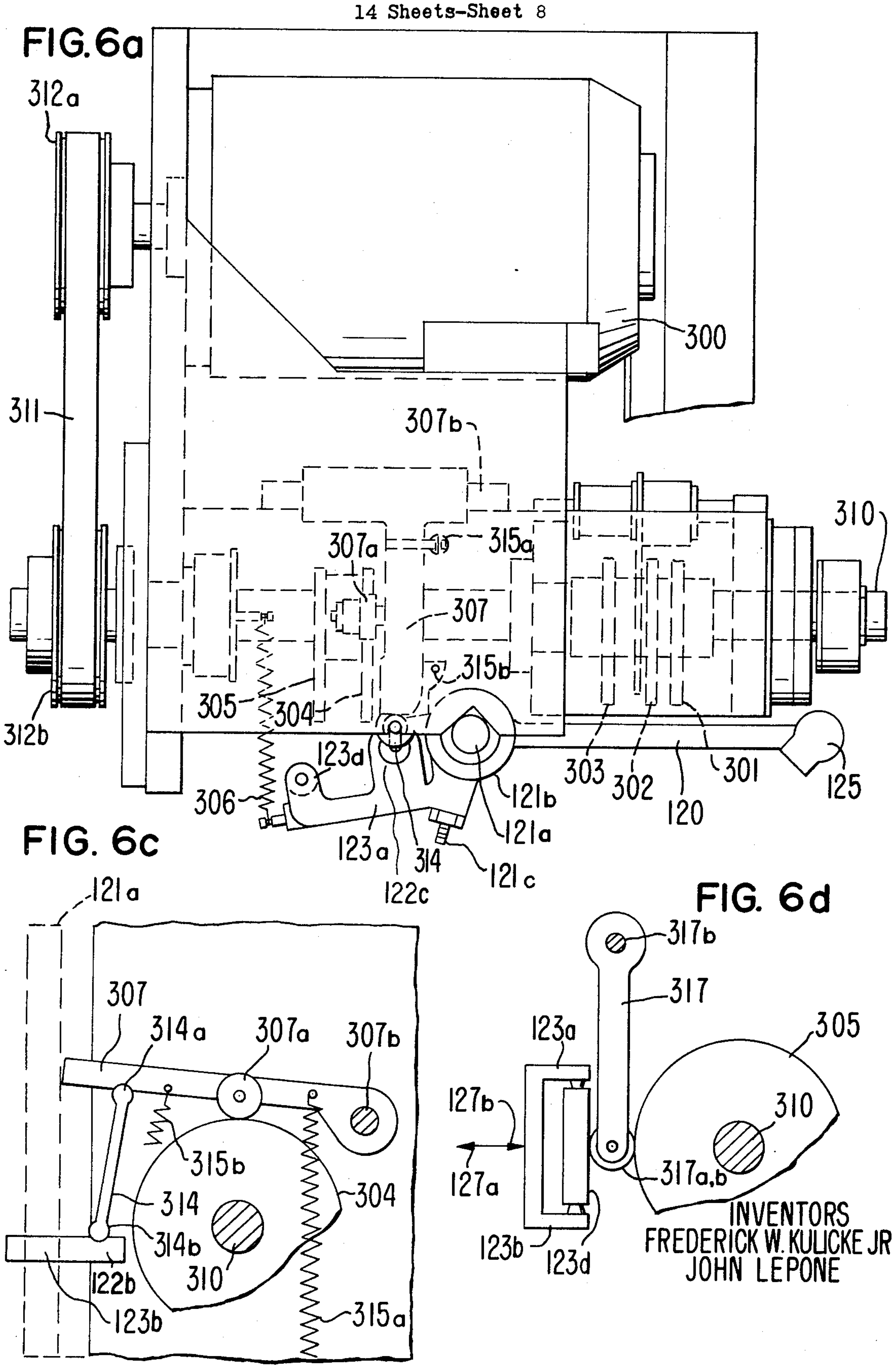

Upon application of the vacuum to vacuum line 125*b* and retention of the die to the capillary 125*s*, the bonder arm is next driven up one fifty-sixth of an inch and then simultaneously driven vertically up shaft 121*a* and rotated about shaft 121*a*. The horizontal rotation about shaft 121*a* is obtained, as described above, by applying horizontal forces to roller 123*d* (FIGS. 3*b* and 6*d*). The vertical motion along shaft 121*a* is obtained by applying vertical forces to extension 123*b* of annular bearing section 121*b*. These forces are applied through lower ball socket 122*c* (FIG. 3*b*) attached to extension 123*b* of bearing section 121*b*. A tie bar 314 (FIG. 6*c*) rests in attachment 122*b* (FIG. 3*b*) and is driven by a cam 304 (FIGS. 6*a*, 6*c*) on the rotating shaft 310 contained within power unit 22 (FIG. 1) to raise arm 120 and pick-up needle 125. Arm 120 is lowered by spring 315*b* (FIG. 6*b*)

Heat Rail Assembly

Figures 4A, 4D:
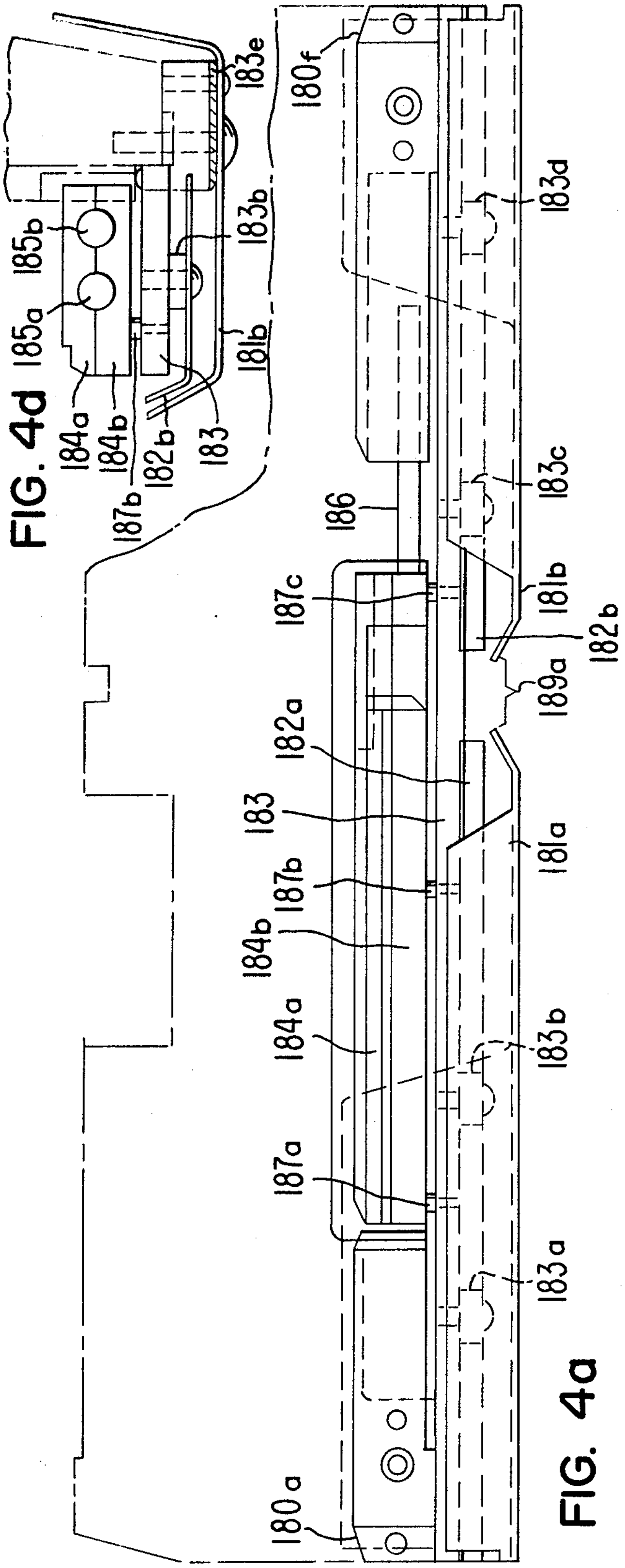
Figure 4B:
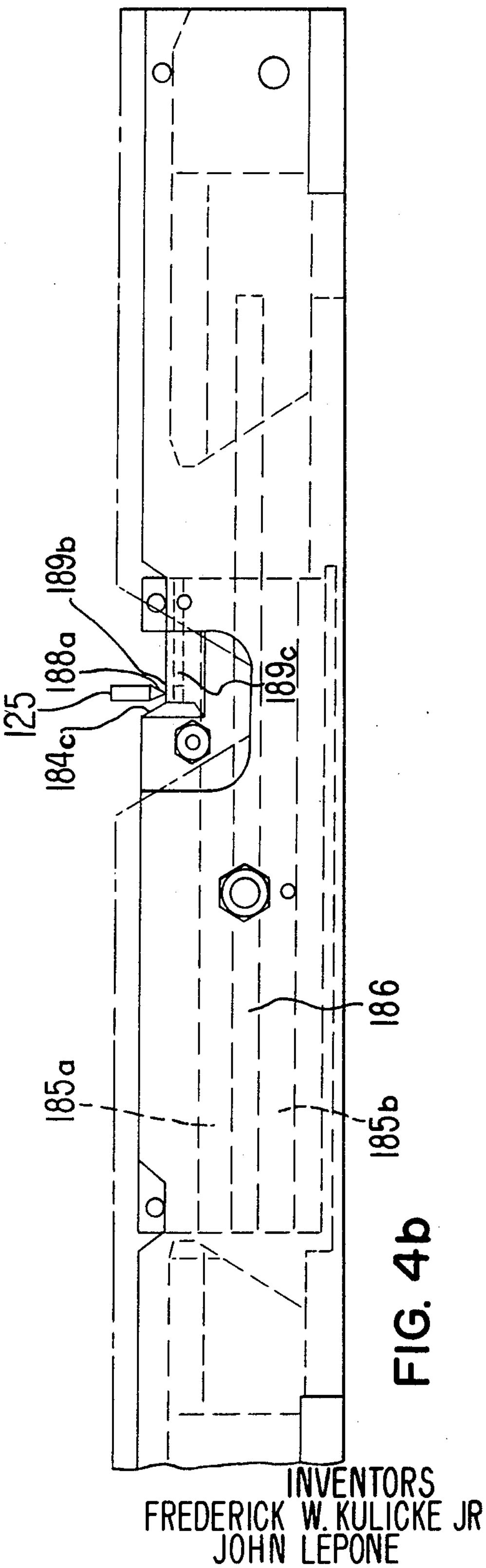
Figure 5A:
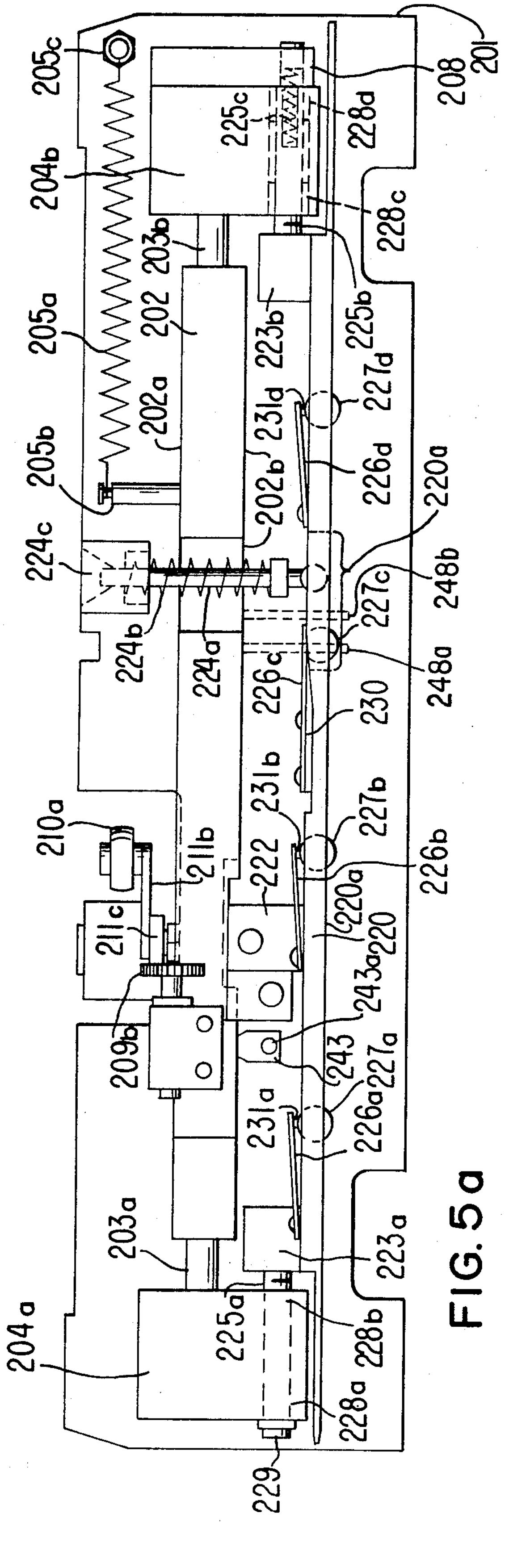
FIGS. 5*a* through 5*g* show the index assembly used to index the lead frame strip along the heat rail.
Figure 5C:
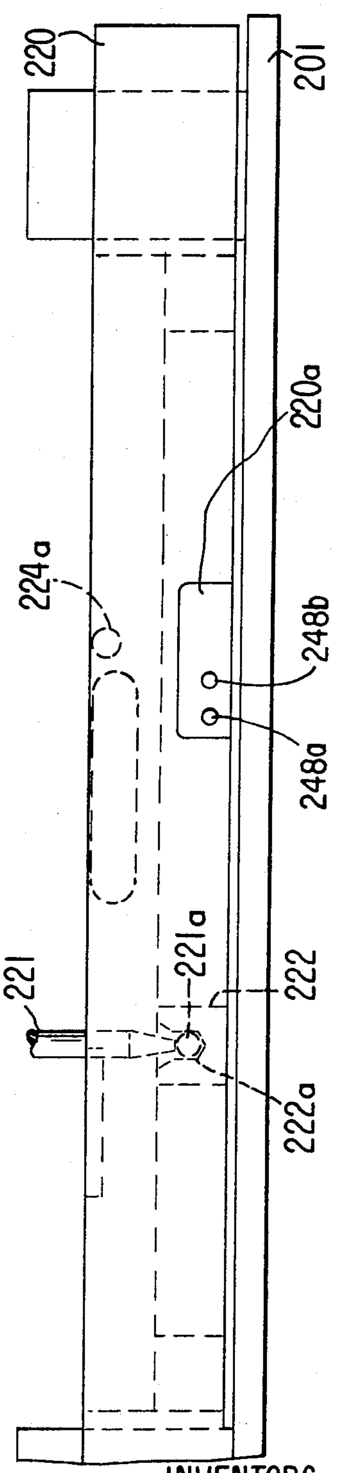

As shown in FIG. 1, the lead frame strip containing the groups of leads with bonding pads to which the dice are to be attached slides from lead frame carrier 23 into slot 188*b* (FIGS. 5*d*, 5*e*) in lead frame heating and indexing assembly 18. FIGS. 4*a* through 4*d* show in more detail the heating portion of the lead frame heating and indexing assembly 18. The lead frame strip enters the heat rail assembly from the left over left hand strip guide 180*a* (FIGS. 4*a*, 4*b*). The lead frame then travels along the strip guide passing by heater blocks 184*a* and 184*b*. Blocks 184 are typically constructed of stainless steel. Running along blocks 184*a* and 184*b* in grooves on the interior of abutting faces of these blocks are cartridge heaters 185*a* and 185*b* (FIGS. 4*b*, 4*d*). Heaters 185*a* and 185*b* heat heater blocks 184*a* and 184*b* to a selected temperature. In addition, gas tube 186 allows a heated gas, typically nitrogen, to pass from the heater blocks 184 through passages (not shown) over the bonding pads on the lead frame strip to assist in heating these pads. The heater block temperature is sensed by thermocouple 189*c*—located directly beneath bonding point 188*a* (FIGS. 4*b*, 4*c*)—which generates a signal which is sent to the circuit controlling the current supplied to cartridge heaters 185*a* and 185*b*. Thus the temperature of heater blocks 184*a* and 184*b* is carefully controlled to match the temperature desired to form the bond between a die and a bonding pad. The temperature control circuit works in a well-known manner and thus will not be described.

The lead frame strip is driven along heater block 184*a* until the bonding pad is opposite opening 189*a* (FIG. 4*a*) between left hand heat guard 181*a* and right hand heat guard 181*b*. Heat guards 181 protect the operator from coming into contact with left hand heat shield 182*a* and right hand heat shield 182*b*. These heat shields in turn are held away from front plate 183—which extends from the left hand edge of left hand strip guide 181*a* to the right hand edge of right hand strip guide 181*b*—by spacers 183*a* through 183*d*. In addition, heat insulator 183*e* (FIGS. 4*c* and 4*d*) is located between the heat guards 181 and the toe clamp 183*f* (FIG. 4*c*). Front plate 183 in turn is held away from the heater block 184*b* by spacers 187*a*, 187*b* and 187*c* (FIGS. 4*a*, 4*d*). Between left hand heat guard 181*a* and right hand heat guard 181*b* is a gap 189*a* (FIG. 4*a*). Through this gap the die pick-up needle 125 (FIG. 3*c*) passes while being moved simultaneously upward and toward the heater block 184 supporting the bonding pad on which the die is to be placed. The die needle comes down on the bonding pad at point 188*a* (FIGS. 4*b*, 4*c*). A channel 184*c* is formed in heater blocks 184*a* and 184*b* to allow for the passage of this needle and die. The die is placed on the bonding pad (not shown in FIG. 4*b*) and the weights 125*d* on the top of the spindle 125*h* (FIG. 3*c*) apply enough pressure to hold the die on the bonding pad while the eutectic or other alloy on the bottom of the die melts to form the bond between the die and the bonding pad.

The lead frame strip is moved along the heat rail assembly by an indexing mechanism shown in the next section.

Index Strip Assembly

FIGS. 5*a* through 5*g* show various views of the components of the assembly for indexing the lead frame strip. This assembly contains three basic subassemblies:

1. A clamp paddle assembly for clamping the lead frame strip in proper position against the heater blocks 184 (FIGS. 4*a*, 4*b*, 4*c*) during the bonding of the die to the proper bonding pad on the lead frame strip;

2. An index finger bar containing two fingers for engaging the lead frame strip to drive the lead frame strip along the heater rail thereby to move the bonding pad to which a die was previously bonded from the bonding position and to bring the next bonding pad into proper position for placement of a die thereon; and 3. An index finger bar support mechanism which slideably rests in support blocks and which moves the index finger bar back and forth parallel to the lead frame strip so as to properly position and then drive the index finger bar so as to move the lead frame strip.

All three subassemblies are mounted on base plate 201 (FIG. 5*a*, 5*b*, 5*c*, 5*f*, and 5*g*). Throughout the following description, the index finger bar support and its components are denoted in combination with letters by numbers 202 through 211, the clamp paddle assembly is denoted in combination with letters by numbers 220 through 231 and the index finger bar assembly is denoted in combination with letters by numbers 240 through 250.

Figures 5B, 5F:
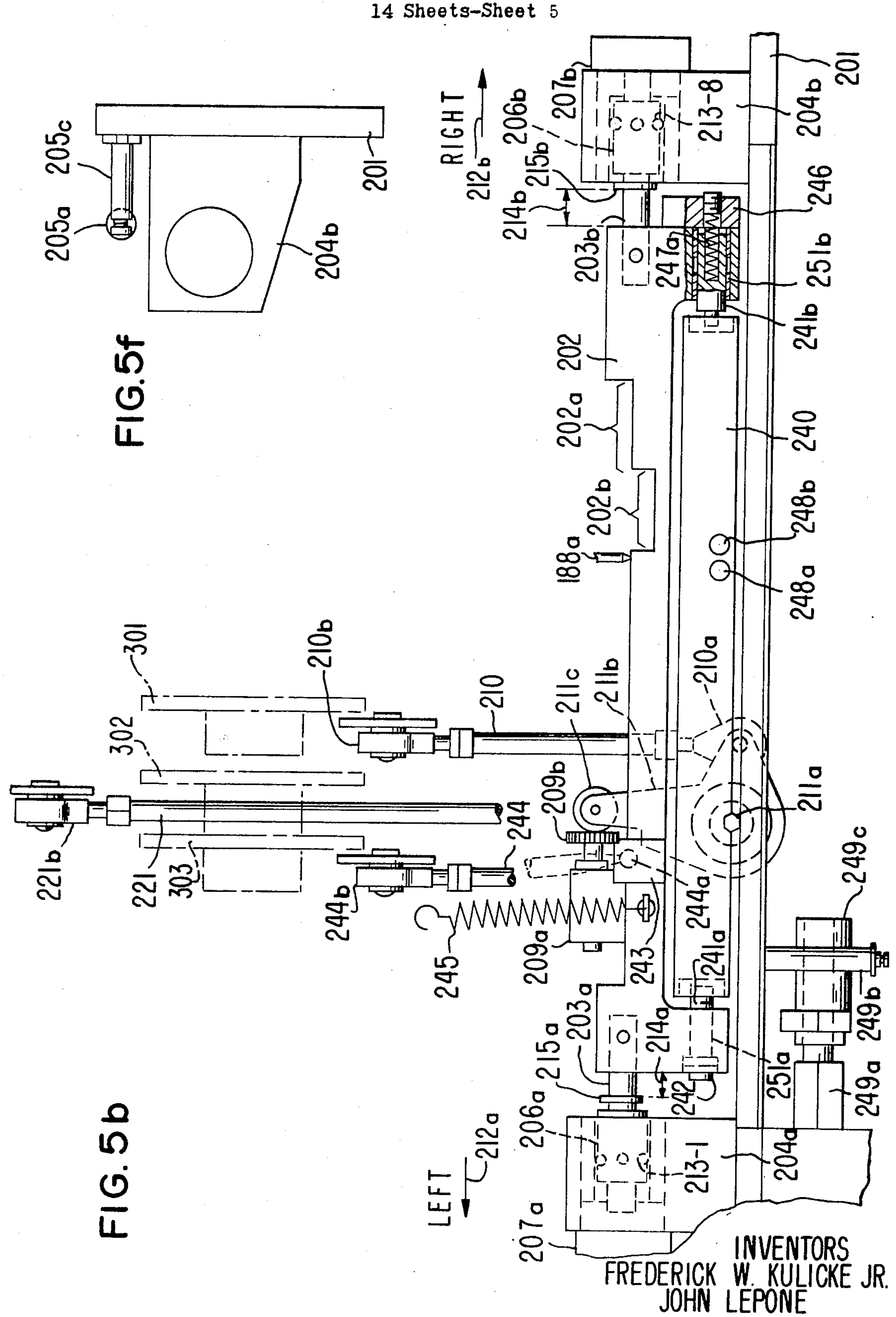
Figure 5D:
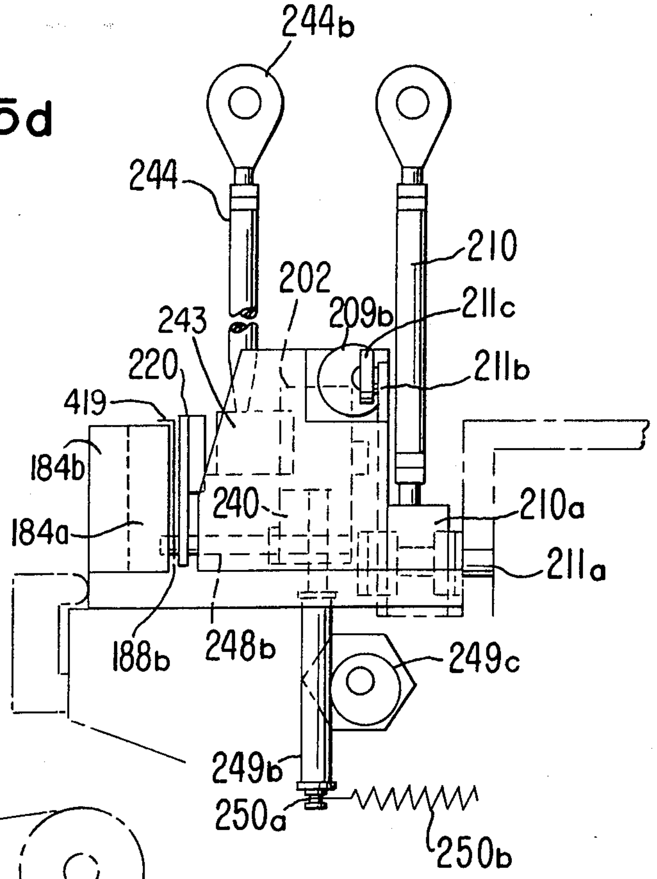
Figure 5E:
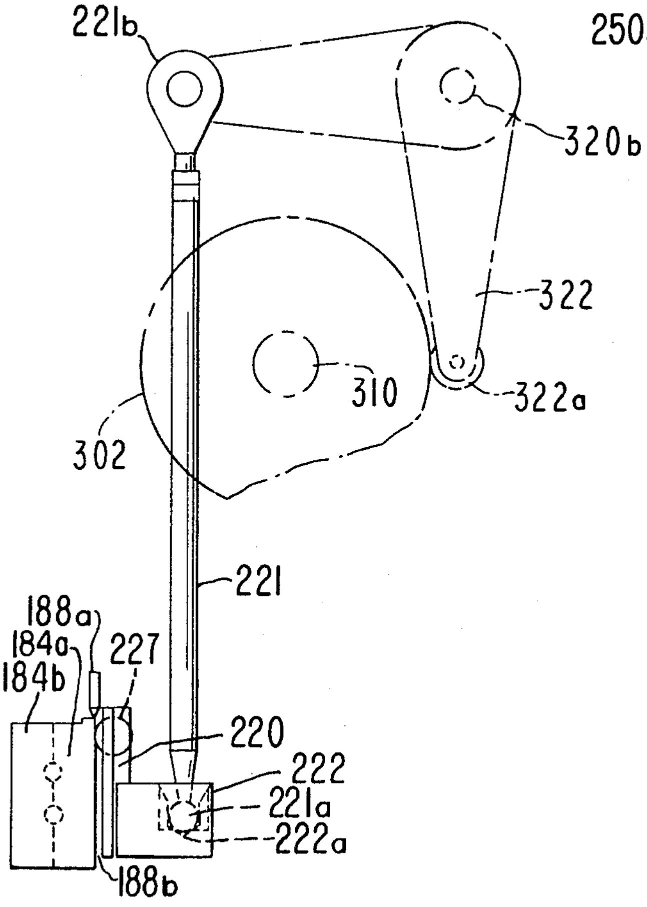
Figure 5G:
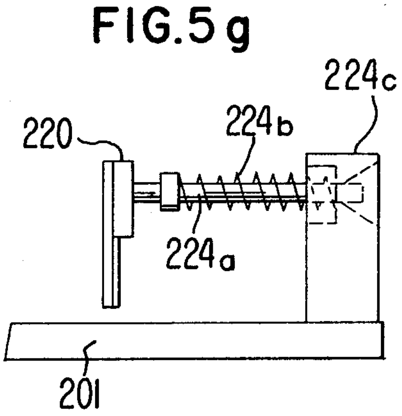

Index finger bar support 202 (FIGS. 5*a*, 5*b*, and 5*d*) supports index fingers 248*a* and 248*b* (FIGS. 5*b*, 5*d* and 6*f*) which drive the lead frame strip 419 (FIG. 5*d*) containing the bonding pads along slot 188*b* (FIG. 5*d*). Support 202 is mounted on end block assemblies 204*a* and 204*b* by means of pivot shafts 203*a* and 203*b*. Located on bar support 202 is feed adjust block 209*a* (FIG. 5*b*) containing feed stroke adjustor 209*b*. Stroke adjustor 209*b* can be moved into or out of feed adjust block 209*a* to adjust the positions to which index finger bar support 202 is driven in the horizontal direction. Bar 202 is driven to the left or right as denoted by arrows 212*a* and 212*b*, respectively (FIG. 5*b*).

Index finger bar support 202 is driven to the left in the direction of arrow 212*a* by means of index push rod 210 attached through rotatable connector 210*a* to one part of L-shaped lever 211*b*. Lever 211*b* rotates about fixed index pivot stud 211*a* in response to upward or downward motion of index push rod 210. Push rod 210 is connected by a rotatable connector 210*b*, also called a Heim bearing, to a lever 321 (FIG. 6*e*) in contact with cam 301 (FIGS. 5*b*, 6*a*, 6*e*). Cam 301 is located in power unit 22 on the single drive shaft 310 and is driven by the motor within this unit. In response to the movement of this cam (to be described later in the description of power unit 22), push rod 210 rises, forcing roller 211*c*, connected to one end of lever 211*b*, against the face of stroke adjustor 209*b*. Stroke adjustor 209*b*, connected through feed adjust block 209*a* to the index finger bar support 202, then drives index finger bar support 202 to the left in the direction of arrow 212*a*. Index finger bar support 202 is supported in end blocks 204*a* and 204*b* ball bearings 213-1 through 213-8 (FIG. 5*b*). In FIG. 5*b*, only six of these balls are shown in detail but it should be understood that four balls are located equidistant around pivot shafts 203*a* and 203*b* to provide rotating, low-friction supports for these shafts.

The position of the lead frame strip on the heater block 184*a* (FIG. 4*a*), can be adjusted by adjusting stroke adjustor 209*b*. Moving stroke adjustor 209*b* to the right moves index finger bar support 202 to the left and vice versa. Grip rings 215*a* and 215*b* are keepers for bearings 206*a* and 206*b* respectively.

At the moment of bonding, index finger bar support 202 is as far to the left in the direction of arrow 212*a* as it can travel. The die is then placed by the pick-up needle 125 on that lead frame strip 419 (FIGS. 5*d* and 7*b*) bonding pad which is located with respect to the index finger bar support 202 at position 188*a* (FIG. 5*b*).

FIG. 5*d* shows an end view of the location of index finger bar support push rod 210 with respect to index finger bar support 202.

FIG. 5*f* shows an end view of the relationship of base plate 201 to right side end block 204*b*.

As shown in FIG. 5*a*, index finger bar support 202 is pulled to the right in the direction of arrow 212*b* (FIG. 5*b*) by a preloading spring 205*a* attached to spring hanger 205*b* rigidly protruding from the back face 202*a* of support 202 and, at the other end, to spring hanger 205*c* rigidly attached to base plate 201 as shown in FIG. 5*f*. Depression 202*b* (FIG. 5*b*) formed in support 202 allows support 202 to move in the horizontal direction beneath shaft 224*a* (FIG. 5*a*) connected to clamp paddle 220. The function of shaft 224*a* will be explained later in this section when the clamp paddle is described.

Rotatably attached to bar support 202 is index finger bar 240 (FIG. 5*b*). Finger bar 240 is rotatably attached to pivot studs 241*a* and 241*b* which rest on bearings 251*a* *and 251b*. Pivot stud 241*a* is rigidly mounted to part 202. Stud 241*b* is slideably mounted in bearings 251*b*. Bearings 251*a* and 251*b* allow index finger bar 240 to rotate about a horizontal axis running longitudinally along finger bar 240. Preload spring 247*a* located within pivot stud 241*b* holds finger bar 240 firmly in its proper position relative to finger bar support 202. Spring 247*a* is held in stud 241*b* by load spring capture block 246. This preload spring absorbs growth caused by thermal expansion of index finger bar 240.

Protruding from the front face of index finger bar 240 are index fingers 248*a* and 248*b* (FIGS. 5*b*, 5*d*). These fingers protrude through opening 220*a* (FIG. 5*c*) in clamp paddle 220 (See also FIG. 5*d*) and pass through mating holes (not shown) in the vertical lead frame strip 419 (FIG. 5*d*) in slot 188*b* (FIG. 5*d*). Thus when index finger bar support 202 is drawn back to the right in the direction of arrow 212*b* (FIG. 5*b*) by spring 205*a* (FIGS. 5*a*) after having been driven to the left by the rising of index push rod 210, fingers 248*a* and 248*b* are inserted into the lead frame strip to drive this strip in the direction of arrow 212*b*. At completion of the feed, these fingers then "tuck" the strip down against the heater block 184*a* (FIG. 5*d*).

Fingers 248*a* and 248*b* are inserted into the lead frame strip 419 (FIG. 5*d*) by the motion of finger pivot push rod 244 driven through Heim bearing 244*b* (FIG. 5*b* and 5*d*) by cam 303 (FIGS. 5*b*, 6*a*, 6*b* and 6*f*) on the single shaft 310 in power unit 22 (FIG. 1). Push rod 244 is raised by a spring 245 (FIG. 6*f*) as cam 303 rotates. Simultaneously, spring 245 (FIGS. 5*b*, 6*f*) pulls up on the front portion of index finger pusher block 243 (FIGS. 5*b* and 6*f*) on support 202 thus maintaining socket 243*a* in pusher block 243 in contact with ball 244*a* on the end of push rod 244. The moments on index finger bar 240 are such that fingers 248*a* and 248*b* are inserted into mating holes in a lead frame strip. FIG. 6*f* shows this structure schematically only.

The relative distance between the lead frame strip 419 in slot 188*b* (FIG. 5*d*) and index finger bar 240 is controlled by the position of eccentric 249*c* (FIGS. 5*b*, 5*d*) which rotates about pivot stud 249*a*. Spring hanger 250*a* (FIG. 5*d*) is attached to pivot sleeve 249*b*. Spring 250*b* in turn is attached to pivot hanger 250*a* and the frame of the die bonder. Rotating finger control eccentric 249*c* adjusts to the left or right (FIG. 5*d*) the position of index finger bar 240 by rotating index finger bar support 202 about its pivot shafts 203*a* and 203*b* (FIGS. 5*a*, 5*b*).

Index finger alignment screw 242 (FIG. 5*b*) allows the position of bar rod 240 to be adjusted to the left or right in the direction of arrows 212*a* or 212*b*, as desired.

When the lead frame strip 419 in slot 188*b* (FIG. 5*d*) is in the proper position to receive a new die on a bonding pad, clamp paddle 220 (FIGS. 5*a*, 5*c*, 5*d*, 5*e*, 5*g*) is pressed firmly against the lead frame strip to force this strip against heater block 184*a*. Clamp paddle 220 is driven by clamp push rod 221 (FIG. 5*c*). Push rod 221 (FIGS. 5*a*, 5*b*, 5*e*) contains a Heim bearing 221*b* connected to lever arm 322 (FIG. 5*e*) which is driven by cam 302 (FIGS. 5*e*, 6*a*, 6*b*) on the shaft 310 in power unit 22 (FIG. 1). Normally, push rod 221 pushes down on clamp paddle pusher block 222 by means of ball 221*a* placed in socket 222*a*. Pusher block 222 is attached to clamp paddle 220. As shown in FIG. 5*a*, clamp paddle 220 contains on its inside face preloaded springs 226*a*, 226*b* and 226*d* in addition to spring pickup plate 226*c*, all positioned so as to press against spherical balls 227*a*, 227*b*, 227*c*, and 227*d*. Preloading pads 231*a*, *b*, and *d* are attached to springs 226*a*, 226*b* and 226*d*, respectively.

When clamp push rod 221 is moved upward by cam 302 attached to drive shaft 310 (FIG. 5*e*), the spring 224*b* (FIGS. 5*a*, 5*g*) — attached at one end to preloading block 224*c* and at the other end to a stop on shaft 224*a* — drives shaft 224*a*. Shaft 224*a*, which is attached to clamp paddle 220, drives paddle 220 against the lead frame strip 419 (FIG. 5*d*) in slot 188*b* (FIG. 5*d*). At this instant, the balls 227*a* through 227*d* (FIG. 5*a*) press against adjacent holes in the lead frame strip and push the lead frame strip solidly against heater block 184*a* (FIGS. 4*a* through 4*c*).

When push rod 221 (FIGS. 5*b*, 5*e*) is again pushed downward, clamp paddle 220 pivots about clamp paddle pivot studs 225*a* and 225*b* (FIG. 5*a*) so as to remove spherical pressure balls 227*a* through 227*d* from contact with the lead frame strip.

Clamp paddle 220 has bearing blocks 223*a* and 223*b* attached to its back side (FIG. 5*a*). Contained within bearing blocks 223*a* and 223*b* are bearings. These bearings allow the clamp paddle to rotate about pivot stud 225*a* which is fixed rigidly to left end block 204*a* and pivot stud 225*b* which is slideably mounted in right end block 204*b*. Bearing blocks 223*a* and 223*b* rotate about pivot studs 225*a* and 225*b* on bearings contained in blocks 223*a* and 223*b*. While pivot stud 225*a* is fixed rigidly to end block 204*a*, stud 225*b* is free to slide in sleeve bearings 228*c* and 228*d* (FIG. 5*a*). Pre-load spring 225*c* contained in stud 225*b* is designed to absorb thermal expansion of the clamp paddle and associated parts so as to maintain the dimensional accuracy of the system.

As shown in FIG. 5*c*, clamp paddle 220 contains an opening 220*a* through which protrude index fingers 248*a* and 248*b* (FIGS. 5*b*, 5*d*). Opening 220*a* allows fingers 248*a* and 248*b* to move in the direction of arrows 212*a*, and 212*b* (FIG. 5*b*). the clamp paddle likewise has an alignment screw 229 (FIG. 5*a*) which can be used to adjust the horizontal position of the clamp paddle with respect to the lead frame strip.

Spring 226*c* (FIG. 5*a*), separated from clamp paddle 220 by spacer 230, presses ball 227*c* against the lead frame strip. Ball 227*c* is designed to press against the lead frame strip directly adjacent the bonding pad to which the die is being bonded at location 188*a* (FIG. 5*b*).

To summarize, the lead frame strip index assembly contains three components, the index finger bar support, the index finger bar itself, and the clamp paddle. The index finger bar support is driven horizontally back and forth and carries with it the index finger bar 240. Index finger bar 240 is rotated about its supports attached to the index finger bar support 202 so as to insert fingers 248*a* and 248*b* into, and to remove fingers 248*a* and 248*b* from, the lead frame strip at the proper times in each bonding cycle. Once each cycle clamp paddle 220 is pressed against the lead frame strip to hold this strip in proper position for the bonding of the die to the bonding pad. All motions, both linear and rotational, of the index finger bar support 202, index finger bar 240 and clamp paddle 220 are derived from cams contained on shaft 310 driven by motor 300 in power unit 22.

Power Unit (Die Bonder Head Assembly)

In this section the motor, transmission, single shaft and cams, drive linkage, timer disc and other related portions of power unit 22 will be described in detail.

As with the above descriptions, the structure described in this section is shown in the drawings only in sufficient detail to enable one skilled in the art to make and use the structure. Keys, set screws and other standard components of the structure which would be obvious to one skilled in the art are omitted for simplicity.

FIG. 6*a* shows in top view the relationship of motor 300 to single shaft 310 containing cams 301 through 305. Cams 301 through 303 drive the index finger bar support 202 (FIG. 5*a*), the clamp paddle 220 (FIGS. 5*a*, 5*c*) and the index finger bar 240 (FIG. 5*b*), respectively. Cams 304 and 305 drive bonder arm 120 (FIGS. 3*a*, 3*b*) vertically and radially, respectively.

Power for motor 300 is transmitted to shaft 310 by transmission and timing belt 311. Belt 311 is driven by pulley 312*a* mounted on the output shaft of motor 300. Pulley 312*b* mounted on shaft 310 is driven by belt 311 and transmits the power from motor 300 to shaft 310.

Mounted on the left hand end of shaft 310 is hand knob 316 (FIG. 6*b*) which allows the operator to rotate shaft 310 manually. Mounted just to the right of hand knob 316 is timing disc 313 containing selected slots therein for use with a light source and photo cell to control the timing of the die bonder. The operation of the timing disc and the photo cells will be described later when the overall system timing is described.

Mounted on shaft 310 from right to left are cams 301 through 305. Cam 301 is shown in more detail in FIG. 6*e*.

Rigidly connected to shaft 310, cam 301 drives roller 321*a* mounted on one end of lever 321. Lever 321 pivots about dead pivot shaft 320*a*. Connected to the other end of lever 321 by Heim bearing 210*b* is index push rod 210. Index push rod 210 drives index finger bar support 202 (FIG. 5*a*) to the left in the index assembly section.

Cam 302 (FIG. 5*e*), also rigidly mounted on shaft 310, controls the motion of clamp paddle 220. Roller 322*a* (FIG. 5*e*) is held against the edge of cam 302. Attached to one end of lever 322, roller 322*a* thus controls the rotational motion of lever 322 about dead pivot shaft 320*b*. Connected to the other end of lever 322 by Heim bearing 221*b* is clamp paddle push rod 221. As described above in the section on the index assembly, upward movement of the clamp paddle push rod 211 allows clamp paddle 220 to be pushed firmly against the lead frame strip in slot 188*b* (FIG. 5*d*) thereby clamping this lead frame strip against heater block 184*a*.

FIG. 6*f* shows cam 303, also rigidly mounted on shaft 310. Roller 323*a*, attached to the middle of lever 323, controls the motion of arm 323 about pivot shaft 320*a*. Attached to one end of lever 323 is index finger push rod 244. Again, as described above in the index assembly section, push rod 244 controls the insertion of fingers 248*a* and 248*b* into the lead frame strip and thus controls the movement of the lead frame strip along the heater rail assembly.

In addition to controlling the motion of the index assembly, cams attached to shaft 310 also control the motion of the bonder arm assembly thereby controlling the motion of die pick-up needle 125 (FIG. 3*c*) from the dice tray on the dice dish assembly 13 (FIG. 1) to the bonding pad on the lead frame strip at position 188*a* (FIG. 5*b*) where the bonding pad is located for the receipt of the die. Vertical motion is imparted to bonder arm 120 (FIG. 6*a*) and needle 125 (FIGS. 6*a*, 6*b*) by cam 304 (FIGS. 6*a* and 6*c*) rigidly attached to shaft 310. As shown in FIG. 6*c*, lever arm 307 has rotatably attached thereto roller 307*a*. *Arm 307 pivots about shaft 307b* and roller 307*a* is held firmly in contact with the edge of cam 304 by tension springs 315*a* and 315*b* (FIGS. 6*a*, 6*c*). Attached to the left end of lever 307 is ball 314*a* of tie bar 314. The other end of tie bar 314, containing ball 314*b*, is attached to a socket 122*b* in, arm 123*b* attached to bonder arm 120.

Shown in FIG. 6*a* is the relationship of vertical shaft 121*a*, about which bonder arm 120 rotates, to shaft 310 and cams 301 through 305.

Shown in FIG. 6*d* is the structure by which radial horizontal motion is imparted to needle 125. Cam 305, rigidly mounted on shaft 310, drives roller 317*a* attached to lever 317. Lever 317 rotates about dead pivot shaft 317*b*. Roller 317*a* is in firm contact with the edge of cam 305. A separate roller 317*b* (not shown) is mounted on an extension of lever 317 to contact only roller 123*d* attached as shown in FIGS. 3*b* and 6*d* to bonder arm 120. In this way each roller 317*a* and 317*b* makes firm non-sliding contact with either cam 305 or roller 123*d*, thereby reducing friction.

Also contained on shaft 310 at its extreme right end is the rotary valve assembly 350 (FIG. 6*b*, not shown in detail) for imparting vacuum to the die pick-up needle 125. This assembly consists of a stationary disc attached to the frame with a port attached to a vacuum supply. A second port is attached by a tube to the pick-up needle. These ports are connected together by a chamber. If the chamber is not closed by a second rotating part, it bleeds to atmosphere thus breaking the vacuum draw on the pick-up needle. This second rotating piece is connected to the shaft 310 and is shaped in such a way to open and close the chamber at the proper time in the timing cycle so as to apply a vacuum to the die pick-up needle over the proper portion of each bonding cycle.

Spotlight Assembly

The spotlight assembly used with this die bonder is described in detail in patent application Ser. No. 27,955 filed May 13, 1970 entitled "Aiming Device for Semiconductor Bonding Apparatus" and assigned to Kulicke and Soffa Industries, Inc., the assignee of this application. Accordingly, this spotlight assembly will not be described in detail in this specification but rather the subject matter of this co-pending application is incorporated herein by reference to the extent necessary to understand the operation of the invention described herein.

Carrier Index

Figure 7A:
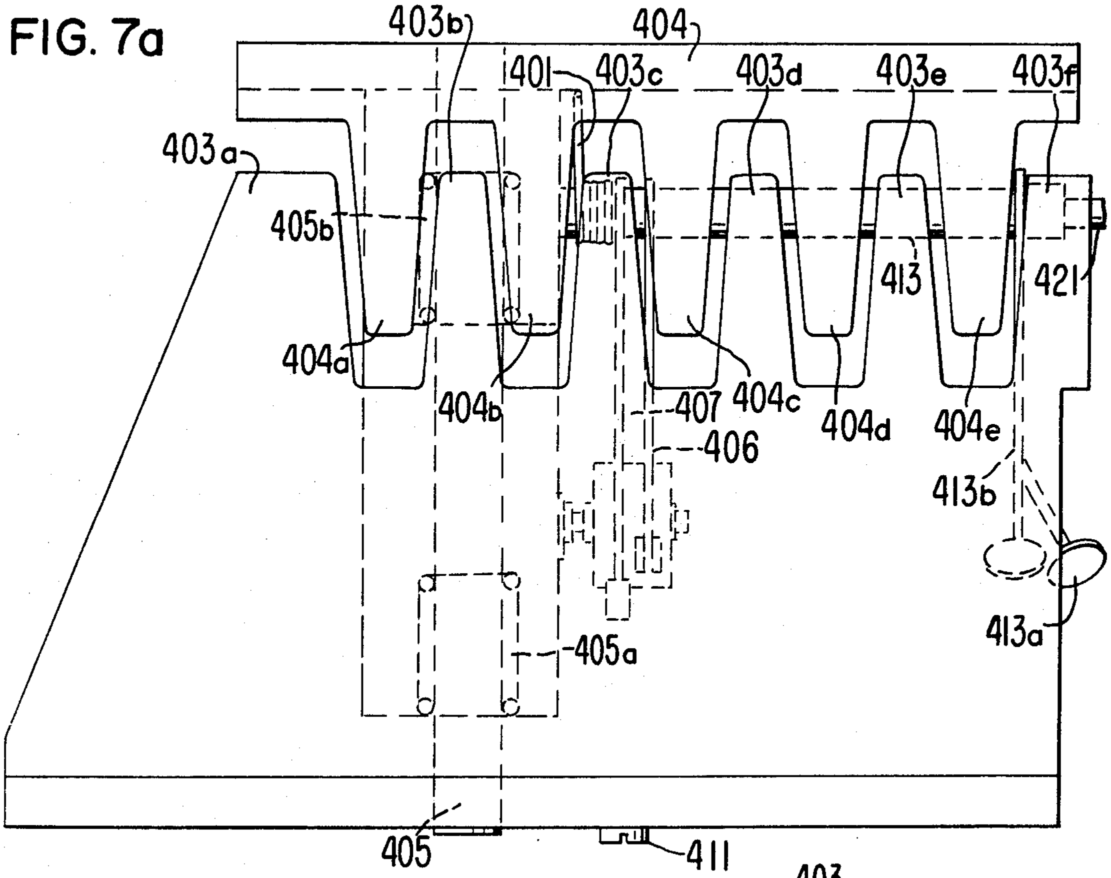
FIGS. 7*a*, 7*b* and 7*c* show the carrier index assembly used to index the carrier carrying the lead frame strips such that each strip is sequentially aligned with the heater rail.
Figures 7B, 7C:
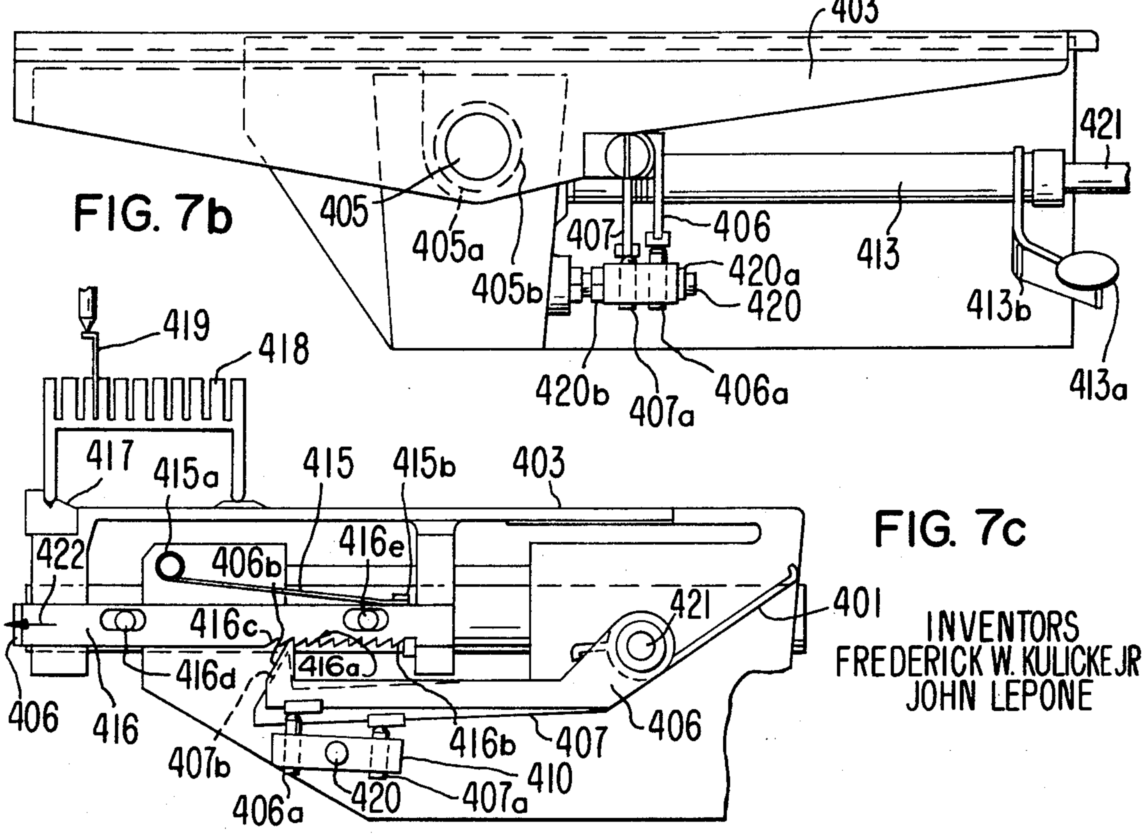

The lead frame strips on which the dice are to be bonded are transported in a carrier 418 (FIG. 7*c*). FIGS. 7*a*, 7*b*, and 7*c* show the indexing mechanism for properly locating the lead frame strip carrier 418. As shown in FIG. 7*c*, carrier 418 is mounted on the top surface of carrier deck 403. Carrier 418 is properly located on this surface by means of locating block 417. Block 417 contains a groove in its top surface for receiving one leg of carrier 418. Placed in vertical slots in the top surface of carrier 418 are a plurality of lead frame strips 419 (FIG. 7*c*) of which for simplicity only one is shown.

Carrier deck 403 moves in the direction shown by arrow 422 (FIG. 7*c*) as a result of a force applied to carrier deck 403 by negator spring 415. Spring 415 is attached to the frame of the die bonder by screw 415a and to carrier deck 403 by means of screw 415b.

Load rachet assembly 416 is attached to carrier deck 403 (FIG. 7*c*). Deck 403 however is rigidly mounted on shaft 405 which in turn is slideably attached to carrier base 404 (FIG. 7*a*) which is rigidly attached to the die bonder frame. Carrier deck 403 and shaft 405 slide along on bushing 405*a* and 405*b* mounted in the carrier base 404 (FIGS. 7*a* and 7*b*).

Load rachet assembly 416 is adjustably attached to carrier deck 403 by set screws 416*d* and 416*e* (FIG. 7*c*). On the bottom surface of rachet assembly 416 are teeth 416*a* possessing a saw tooth shape. Normally point 406*b* of pawl 406 engages the flat surface of one of these teeth preventing carrier deck 403 from being pulled in the direction of arrow 422 by negator spring 415. When the lead frame strip 419 contained in carrier 418 is to be aligned with slot 188*b* (FIGS. 5*d*, 5*e*), the operator presses button 413*a* attached by lever 413*b* to annular cylindrical coupling 413 (FIG. 7*b*). Depressing button 413*a* depresses pawl 406. Pawl 406 pushes on button 406*a* contained in pivot block 410. Rotating about shaft 420, pivot block 410 forces the point 407*b* of pawl 407 up into contact with the tooth surface just disengaged by point 406*b* of pawl 406. However, point 407*b* is one-half the tooth pitch further removed from shaft 421 about which pawls 406 and 407 rotate than is point 406*b* of pawl 406. Consequently, carrier deck 403 is pulled one-half the tooth pitch in the proper direction by negator spring 415. However, point 407*b* of pawl 407 catches and stops carrier deck 403 from going further. When the operator releases button 413*a*, pawl 406 is driven by pawl spring 401 back into contact with the vertical surface of the next tooth 416*a* on the bottom of rachet 416. Consequently, carrier deck 403 moves to the left in the direction of arrow 422 the remaining tooth pitch distance. Pawl 406 prevents carrier deck 403 from moving again in the direction of arrow 422 until button 413*a* is pressed again.

The position of carrier deck 403 with respect to carrier base 404 is controlled by adjustment screw 411 (FIG. 7*a*). Screw 411 adjusts the position of rachet 416 with respect to set screws 416*d* and 416*e* attached to the bottom of carrier deck 403. Carrier deck 403 contains finger-like protrusions 403*a* through 403*f* which mate with voids between similar finger-like protrusions 404*a* through 404*e* on carrier base 404 (FIG. 7*a*).

While FIGS. 7*a* through 7*c* show the carrier deck used to hold the carrier 418 containing lead frame strips to which semiconductor dice are to be bonded, the die bonder of this invention also has a similar carrier indexing structure for holding and indexing the carrier containing the lead frame strips as they come off the die bonder. This structure is substantially identical to the structure shown in FIGS. 7*a* through 7*c* except that the carrier is driven in the opposite direction from the carrier just described. For simplicity, this carrier deck for holding the carrier containing the completed lead frame strips will not be described in detail.

Timing Diagrams

Figures 8A, 8B, 8C, 8D, 8E, 8F:
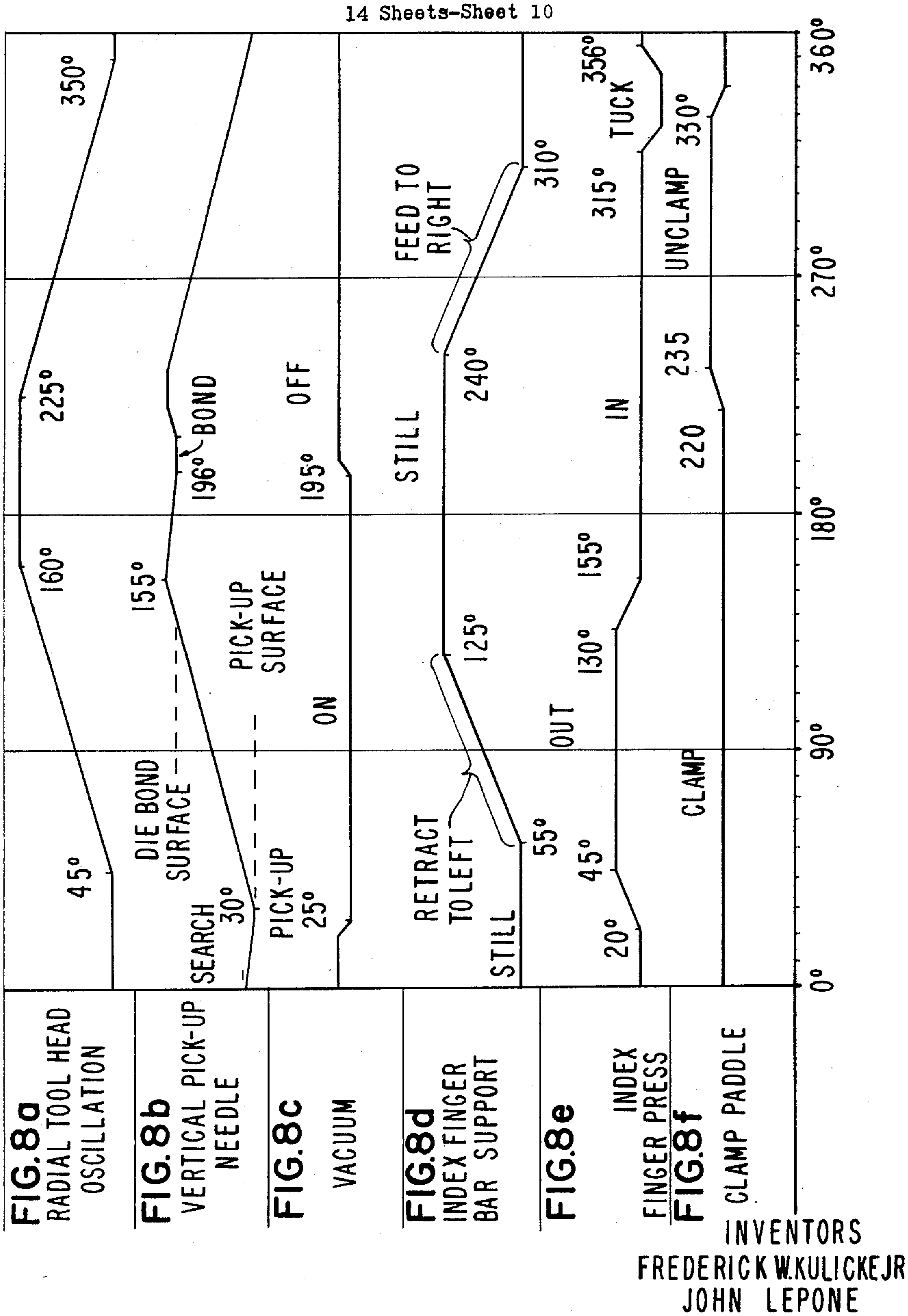
FIGS. 8*a* through 8*f* show in graphical form the relative positions of the components of the die bonder of this invention as a function of angular position of the cam shaft controlling these components.

FIGS. 8*a* through 8*f* show timing diagrams of use in explaining the operation of the die bonder of this invention. FIGS. 8*a* and 8*b* describe the radial and vertical motions respectively of pick-up needle 125. (FIGS. 3*b*, 3*c*). FIG. 8*c* shows the portion of each bonding cycle during which vacuum is applied to the pick-up needle. FIGS. 8*d* through 8*f* show the motion of the index finger bar support, the index fingers and the clamp paddle. The abscissa of all figures is the angular position of shaft 310 (FIGS. 6*a*, 6*b*) in degrees. The figures describe the positions of the various components of the die bonder over one bonding cycle.

At zero degrees, the pick-up needle is located just above the die on dice dish assembly 13 (FIG. 1). From 0° to 25° rotation of shaft 310, the pick-up needle drops to the die. Sometime during the first 25° of rotation of shaft 310, the flat face of the pick-up needle comes to rest on the top of the die. During the rotation of shaft 310 from 25° to 30° the pick-up needle rests on the die. During this time no radial motion is imparted to pick-up needle 125 as shown by FIG. 8*a*. Vacuum, however, is applied to the pick-up needle by valve 350 (FIG. 6*b*) while shaft 310 rotates between 20° and 25° (FIG. 8*c*). During this period the index finger bar support 202 is not moved (FIG. 8*d*) and the index fingers remain partially engaged in the lead frame strip. While the shaft 310 rotates from 20° to 45°, these index fingers are withdrawn from the lead frame strip (FIG. 8*e*). FIG. 8 *f* shows, however, that the clamp paddle is pressed firmly against the lead frame strip while shaft 310 rotates from 0° all the way to 220°. Thus the lead frame strip is firmly held in position against heater block 184*a* (FIGS. 4*a*, 4*b*, 4*d*). When shaft 310 rotates beyond 30°, pick-up needle 125 (FIG. 3*a*, 3*b*, 3*c*) begins to rise. It continues to rise until the shaft rotates to about 150° (FIG. 8*b*). Simultaneously, needle 125 is moved in the radial direction toward the heater rail assembly. This movement occurs while shaft 310 rotates from 45° to 160°. At 150°, the vertical movement of needle 125 stops and the needle retains its vertical position for 5°. From 155° to 196°, the needle drops slightly bringing the die down to the bonding pad. The bonding pad's die bond surface is located 1⅝ inches above the pick-up surface. While needle 125 drops to the horizontal die bond surface (point 188*a*, FIG. 4*b*) on lead frame 419 (FIG. 5*d*), needle 125 remains fixed in angular position as shown by FIG. 8*a*. In fact, needle 125 remains fixed radially while shaft 310 rotates from 160° to 225°.

Vacuum is drawn on the needle until approximately 195°, or 1° before the pick-up needle reaches the die bond surface. Between 195° and 200°, the vacuum is removed from he needle and the die is released while on the bonding surface. Weights on the needle, however, ensure that the needle continues to press on the die while the eutectic or other alloy on the bottom of the die melts thereby bonding the die to the underlying die bond surface. Bonding occurs when shaft 310 has rotated to about 203°. At 210° needle 125 rises about forty thousanths of an inch and remains at this height until shaft 310 has rotated to 235°. However, at 225° (as shown by FIG. 8*a*), needle 125 begins to move radially back toward dice dish assembly 13 (FIG. 1). At 350°, needle 125 reaches its proper position over the dice dish assembly and radial motion of the needle again stops. From 235° on through to 25° into the next cycle, however, die pick-up needle 125 drops vertically in a linear manner with the angular position of shaft 310, as shown by FIG. 8*b*, until needle 125 comes into contact with the next die to be bonded. Vacuum on needle 125 remains off while shaft 310 rotates from 200° all the way around to about 20° into the next cycle (FIG. 8c).

While needle 125 is moving as described in FIGS. 8*a* and 8*b*, the index finger bar support, the index fingers, and the paddle clamp, are simultaneously being moved by cams 301 through 303 on shaft 310. During the first 55° motion of shaft 310, the index finger bar support remains stationary. However, from 55° to 125°, the index finger bar support 202 (FIG. 5*b*) moves to the left in the direction of arrow 212*a* (FIG. 5*b*). From 125° to 240°, the index finger bar support remains in its left-most position. Then from 240° to 310°, the index finger bar support 202 moves to the right, feeding the lead frame strip 419 (FIG. 5*d*) to the right in the direction of arrow 212*b* (FIG. 5*b*) so as to remove the bonding pad to which a die has just been attached and bringing another pad into the bonding position 188*a* (FIG. 4*b*). From 310° all the way to 55° into the next bonding cycle, index finger bar support 202 again remains stationary.

During motion of the index finger bar support 202 to the left, the index fingers 248*a*, 248*b* (FIGS. 5*a*, 5*b*, 5*c*, 5*d*, 6*f*) have been removed from the lead frame strip so as not to move this strip back to the left. This is shown by FIG. 8*e*, which shows that the index fingers are partially inserted into the lead frame between 0° and 20°, and are removed from the lead frame while shaft 310 rotates from 20° to 45°. Thus the index fingers are removed from the lead frame strip for 10° before the index finger bar support begins its motion to the left. At 130°, 5° after the index finger bar support has reached its left-most position, the index fingers are inserted into the lead frame strip. Insertion takes 25° of rotation of shaft 310. From 155° to 315° the index fingers are partially pressed into the lead frame strip thereby moving the lead frame strip to the right with the index finger bar support 202 (FIG. 5*b*) while shaft 310 rotates from 240° to 310°. From 315° to 356°, the fingers are more firmly placed into the lead frame strip in the "tuck" mode of operation. During this time the lead frame is firmly placed against heater block 184*a* (FIGS. 4*a*, 4*d*, 5*d*) in preparation for the next bonding operation. From 356° again through 20° of the next cycle, the fingers remain partially inserted into the lead frame strip.

During movement of index finger bar support 202 to the left (FIG. 5*b*), the clamp paddle 220 remains firmly pressed against the lead frame strip, thereby holding the lead frame strip firmly against heater block 184*a*

(FIG. 4*a*). Only after the die has been bonded to the bonding pad, that is while shaft 310 rotates between about 220° to 340°, is the lead frame strip unclamped. It is during this time, particularly while shaft 310 rotates between 240° and 310°, that the lead frame strip is moved to the right by index finger bar support 202. At 330°, the clamp paddle is again actuated, and by 340°, the clamp paddle is pressed firmly against the lead frame strip and remains so pressed until shaft 310 is rotated 220° into the next cycle.

An examination of FIGS. 8*e* and 8*f* shows that the tuck operation of the index fingers occurs just prior to and during the clamping of the lead frame strip by the clamp paddle. The tuck operation thus ensures that the lead frame strip is properly located with respect to heater block 184*a* prior to the pressing of the lead frame strip against heater block 184*a* by the clamp paddle.

The timing disc on the left end of shaft 310 (FIGS. 6*a*, 6*b*) contains a transparent region which allows light from a light source to pass to a photocell when shaft 310 is in its 0° position. This stops motor 300 (FIG. 6*a*) for a predetermined, adjustable time period. As shaft 310 rotates, this timing disc likewise rotates and when shaft 310 rotates to 195°, two transparent regions located on different radii come between two light sources and two photocells. These two transparent regions then signal the control system activating a counting device. Motor 300 (FIG. 6*a*) is again immediately shut off and remains off for the predetermined adjustable time period. This allows the die bonding rate to be adjusted to operator proficiency.

Bonder Control

As described above in the section labeled Dice Dish Assembly, the operator turns on motor 300 (FIG. 6*a*) by pressing button 134 (FIG. 2*a*) on the back of pedestal 138. This begins the continuous cyclic operation of the die bonder. Needle 125 picks up a die from dice dish assembly 13 (FIG. 1) and carries this die to a bonding pad. After the thermocompression bonding is completed, the needle returns to the dice dish assembly to pick up another die which the operator, in the interim, has moved into the proper position in the light beam from spotlight assembly 19. The cyclical operation of the die bonder continues se long as the operator presses the button on dice dish assembly 13.

Figure 9A:
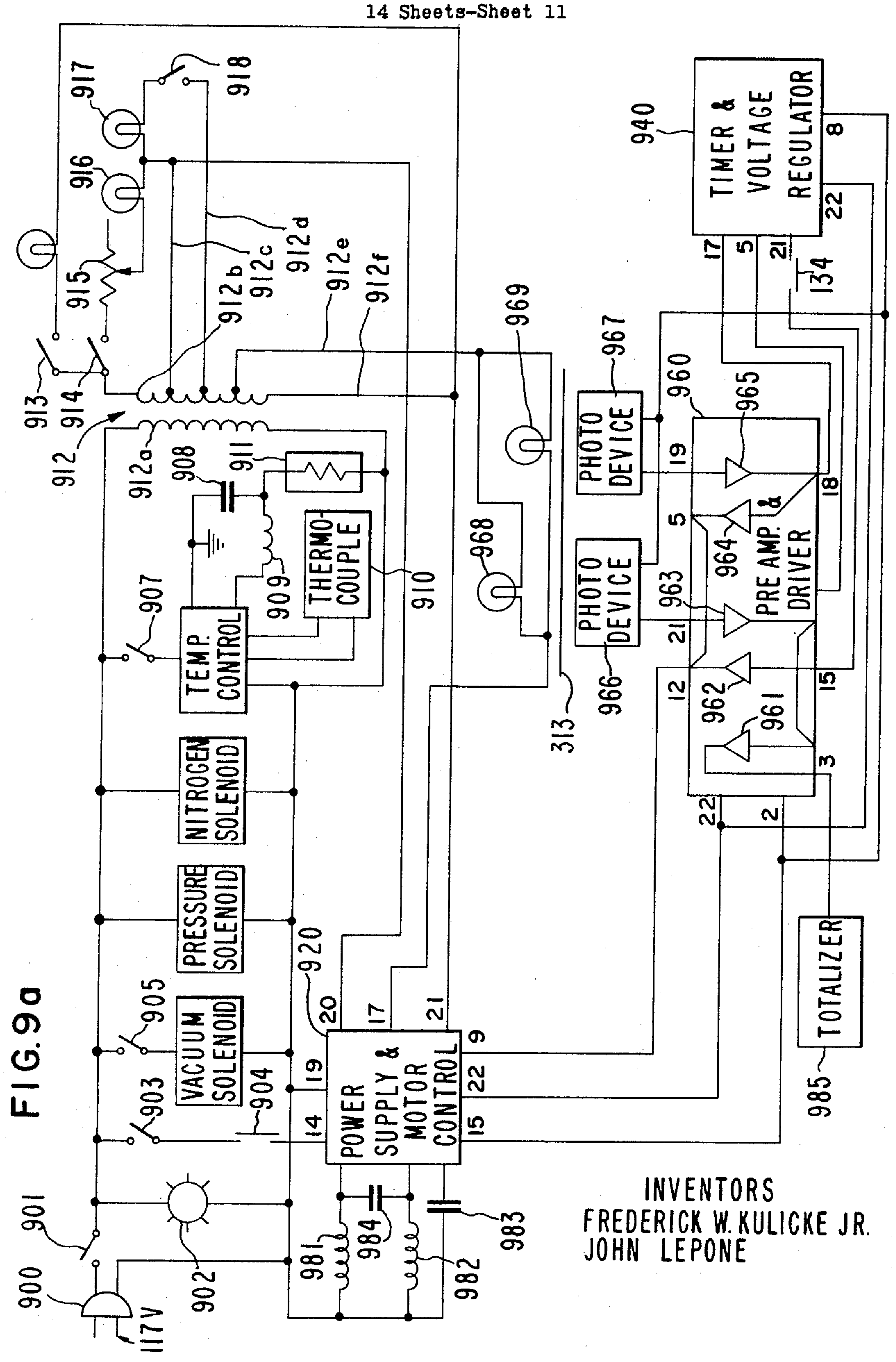
FIGS. 9*a* through 9*d* show the circuits used to control the operation of the die bonder of this invention.

FIG. 9*a* shows schematically the circuit used to control the operation of the die bonder. 117 volt A.C. power is applied to the system through plug 900. The operator turns on the power by closing switch 901. Light 902 glows when the power is on. By closing switch 901, power is supplied to the pressure solenoid which opens a valve to supply air to the air bearings on which the die bonder arm rotates and on which the pick-up needle slides. When the air pressure is above a threshold pressure, motor interlock switch 904 closes, supplying power to the power supply and motor control 920. Switch 905 supplies power to the vacuum solenoid which allows vacuum to be applied to needle 125. Closing switch 901 also activates the nitrogen solenoid thus supplying nitrogen to the heat gas tube in the heater block assembly. Switch 907 must be closed to turn on the temperature controller. The temperature controller responds to signals from the thermocouple 189*c* placed in the heater block (FIG. 4*b*) just beneath the die bonding point to hold the temperature of the heater block at the proper temperature to melt the eutectic on the bottom of the semiconductor die. The temperature controller supplies current through inductor 909 to the main heater 911. Bypass capacitor 908 filters out high-frequency noise.

Power is also supplied through primary winding 912*a* of transformer 912 to the secondary winding 912*b* of this transformer. Pressing of switch 913 allows the operator to turn on a light which calls the supervisor to the die bonder. Pressing of switch 914 supplies current through adjustable resistor 915 to light bulb 916 which illuminates the area of the dice dish assembly. Closing switch 918 supplies light to spotlight 917 which shines on the location in which the operator must place each die to be picked up by needle 125.

The secondary winding 912*b* has, in one embodiment, a total A.C. voltage across it of 24 volts. Leads 912*c* and 912*f* are connected to pins 20 and 21 respectively on power supply 920. Five volts is supplied through pin 17 on power supply 920, and lead 912*e*, to lights 968 and 969, which activate, through slots in disc 313 on shaft 310 (FIG. 6*b*) driven by motor 300 (FIG. 6*a*), photodevices 966 and 967, respectively.

The main drive motor 300 (FIG. 6*a*) is represented by inductors 981 and 982 and capacitor 984 (FIG. 9*a*). Capacitor 983 stores braking charge to stop the motor promptly.

Figure 9B:
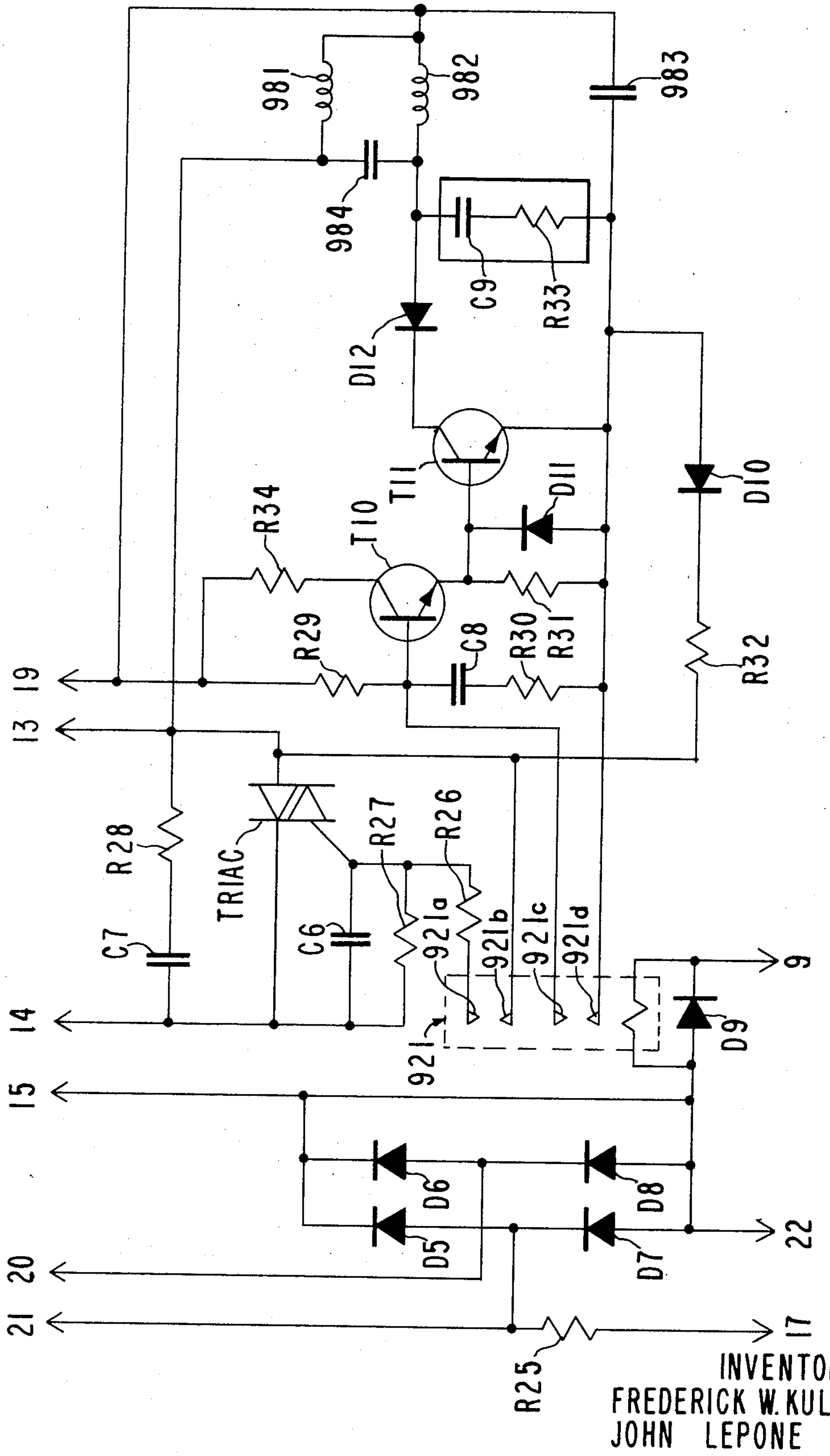
Figure 9C:
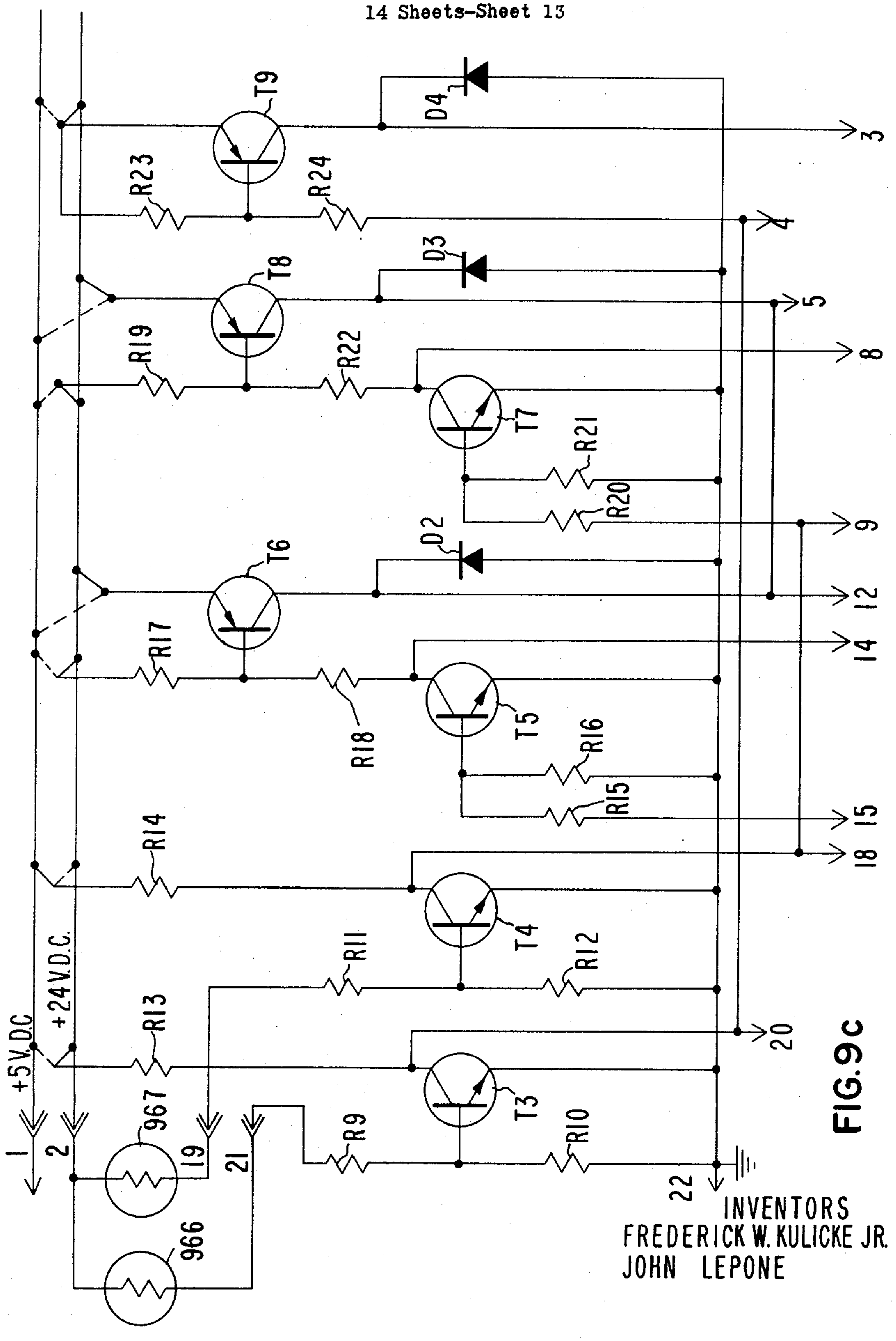

FIG. 9c shows in detail the preamp and driver circuit 960. Photodevices 966 and 967 contain resistances which decrease in response to incident light. Device 966 receives light from bulb 968 while device 967 receives light from bulb 969. As the resistance of device 966 drops, the current through this device and thus through resistors R9 and R10 increases. The increase in current across resistor R10 increases the voltage across this resistor and thus turns on normally-off transistor T3. The current through collector resistor R13 lowers the output voltage on the collector of T3. This output voltage on pin 20 is then transmitted from pin 20 to pin 4. The drop in collector voltage on transistor T3 causes current to flow through resistors R23 and R24 thereby turning on normally-off PNP transistor T9. The turning on of transistor T9 produces a signal which is transmitted on pin 3 from preamp and driver 960 to totalizer 985 (FIG. 9*a*). The total count displayed by totalizer 985 thus increases by one. When the operator presses the switch 134 (FIGS. 2*a* and 9*a*), power is supplied to motor 300 (FIG. 6*a*) except when slots in disc 313 (FIG. 6*b*) allow light from bulb 969 to fall on photodevice 967. Thus when no light is incident on photodevice 967, this device has a large impedance preventing tranSistor T4 from being turned on. The collector voltage on transistor T4 is thus high. This high level voltage is transmitted from pin 18 to pin 9 of preamp and driver circuit 960 and from pin 9, through resistor R20 to the base of transistor T7. Transistor T7 is thus turned on. The collector current of transistor T7 is drawn through resistors R19 and R22. Connected at the node of these latter two resistors is the base of PNP transistor T8. The voltage drop across resistor R19 created by the collector current of transistor T7 turns on transistor T8. The collector signal from transistor T8 is transmitted from pin 5 to pin 12 of preamp and driver circuit 960 and from pin 12 to pin 9 of power supplY and motor control circuit 920 thereby activating relay 921 (FIG. 9*b*) and bringing together contact points 921*a* and 921*b*, and also bringing together contact points 921*c* and 921*d*.

As will be seen later, the input voltage on pin 15 of preamp and driver circuit 960, which is supplied through resistor R15 to the base of transistor T5, is a low level signal during most of the operation of motor 300. This low level signal holds off NPN transistor T5. The high level collector voltage on transistor T5 in turn holds off PNP transistor T6. But because transistor T8 is normally on, and the high level collector voltage of transistor T8 is also transmitted from pin 12 of circuit 960 to relay 9, relay 9 is held on.

Twice each cycle light from bulb 969 passes through slots in disc 313 (FIG. *6b*) to activate photodevice 967 to turn off the normally-on motor. The decrease in resistance of device 967 (FIG. *9c*) results in an increase in current through resistors R11 and R12 thereby turning on normally-off transistor T4. The collector current of transistor T4 passes through collector resistor R14 thereby dropping the collector voltage on T4. This voltage is transmitted from pin 18 to pin 9 of preamp 960 and there through resistor R20 to the base of transistor T7. The sudden drop in the collector voltage of transistor T4 turns off transistor T7. Consequently, the collector voltage of transistor T7 rises to approximately the supply voltage of 24 volts (received from power supply 920 on pins 2 and 22 of preamp and driver 960). Thus the base voltage of transistor T8 at the node between bias resistors R19 and R22 goes approximately to the emitter voltage of transistor T8 thereby shutting off transistor T8. Consequently, the output voltage on pin 5 from preamp and driver 960, which is transmitted to pin 12 and there taken to pin 9 on power supply and motor control 920 (FIG. *9b*), drops from a high to a low level.

As described above, a high level signal on pin 9 of control 920 (FIG. *9b*) operates relay 921 to bring together points 921*a* and 921*b* and also to bring together points 921*c* and 921*d*. The receipt of the low level signal from the collector of transistor T8 thus turns off relay 921, separating these two sets of contacts. This shuts off the current through resistor R26 to the gate of the triac thereby switching the triac from its low impedance to its high impedance state. Accordingly, no current is supplied to the main drive motor and the main drive motor shuts off. Resistor R27 and capacitor C6 filter high frequency noise to prevent the triac from being triggered by this noise.

The output pulse from transistor T4 (FIG. *9c*) is also transmitted from pin 18 of preamp and driver 960 to pin 17 of timer and voltage regulator 940 (FIG. *9d*). The drop in collectOr voltage on transistor T4 from high to low is transmitted through resistor R1 to the base of normally-on transistor T1. The sudden drop in base voltage on this transistor turns off this transistor thereby providing a high impedance to the current which normally flows through resistors R3 and R2 to the emitter of transistor T1.

A DC voltage is applied to pin 8 of the timer and regulator circuit (FIGS. *9a* and *9d*). This voltage, derived from pin 15 of power supply and motor control 920 (FIGS. *9a* and *9b*), is then transmitted through resistor R7 (FIG. *9d*) and zener diode D1, connected as a voltage divider, to the common lead, pin 22 of the timer and voltage regulator circuit 940. This common lead is connected back to pin 22 of power supply and motor control 920 (FIGS. *9a* and *9b*). The voltage drop across zener diode D1 is held at 5 volts. Thus 5 volts is maintained on pin 20 from timer and voltage regulator circuit 940 and likewise 5 volts is supplied to elements 944*a*, 944*b*, 942 and 943, which in the preferred embodiment are all part of one integrated circuit. Elements 944*a* and 944*b* comprise a flip-flop circuit. The 24 volts on pin 8 are also transmitted through variable resistor R5 and then through resistors R3 and R2 to the collector of transistor T1. Thus when transistor T1 is shut off, the current which passes through resistors R5 and R3 charges capacitor C2. Connected at the node between capacitor C2 and resistor R3 is the emitter of unijunction transistor T2.

Unijunction transistor T2 is normally in its high impedance state. When, however, capacitor C2 charges to a given voltage, the charge accumulated on capacitor C2 discharges through the emitter to base B1 of this transistor. The time necessary for capacitor C2 to charge to a voltage sufficient to discharge through unijunction transistor C2 is varied by adjusting resistor R5. This resistor can be varied from 500K ohms to zero ohms. Consequently, the delay introduced by this resistor in series with resistor R3 and capacitor C2 varies from 0.3 seconds down to about 0.01 seconds. By varying the size of R5 and C2, other delays can also be used with this invention.

The discharging of capacitor C2 to base B1 of unijunction transistor T2 creates a positive voltage pulse across resistor R6. This voltage pulse is transmitted as a negative pulse through inverting amplifier 942 to one input lead of element 944*a* in the flip-flop composed of elements 944*a* and 944*b*.

Elements 944*a* and 944*b* each produce a high level output signal in response to a low level input signal on either one or both input leads. These elements produce a low level output signal only when both input leads contain high level signals. Normally the signal on pin 17 derived from the collector voltage of transistor T4 (FIG. *9c*) is high level. Thus the output signal from element 944*b* is high level. This high level signal is transmitted to one input lead of element 944*a*. The other input lead to element 944*a* also has a normally high level signal thus insuring that the output signal from element 944*a* is normally low level. This low level signal from element 944*a* is transmitted from pin 21 of the timer and voltage regulator 940 (FIGS. *9d* and *9a*), through start switch 134 (FIGS. *2a* and *9a*), to pin 15 (FIGS. *9a* and *9c*) at the input lead of preamplifier 962 in preamp and driver circuit 960, and then through resistor R15 (FIG. *9c*) to the base of transistor T5 thereby keeping transistor T5 normally off.

However, the negative pulse from inverting amplifier 942 generated by the discharge of capacitor C2 through unijunction transistor T2, switches the output signal from element 944*a* from low to high level. This high level signal is fed back to one input lead of element 944*b*. On the other input lead to element 944*b* is the high level output signal from element 943 generated by the low level output signal produced by the turning on of transistor T4 (FIG. *9c*). Thus the output signal from element 944*b* switches from high level to low level.

The high level output signal from element 944*a* is transmitted from pin 21 of timer and voltage regulator circuit 940 (FIG. *9a*) through switch 134 on dice pedestal 13 (FIG. *2a*) to pin 15 on preamp and driver circuit 960 (FIGS. *9a* and *9c*). The high level signal from element 944*a* turns on transistor T5. The collector current of transistor T5 passes through resistors R17 and R18 thereby turning on PNP transistor T6. The high level signal produced on the collector of transistor T6 is transmitted from pin 12 on preamp and driver circuit 960 to pin 9 of power supply and motor control 920. This high level signal there activates relay 921 bringing contact points 921*a* and 921*b* together and also bringing contact points 921*c* and 921*d* together. Consequently, gate current is again supplied to the triac, changing the triac from its high impedance to its low impedance state thereby to allow current to be supplied to the motor.

Figure 9D:
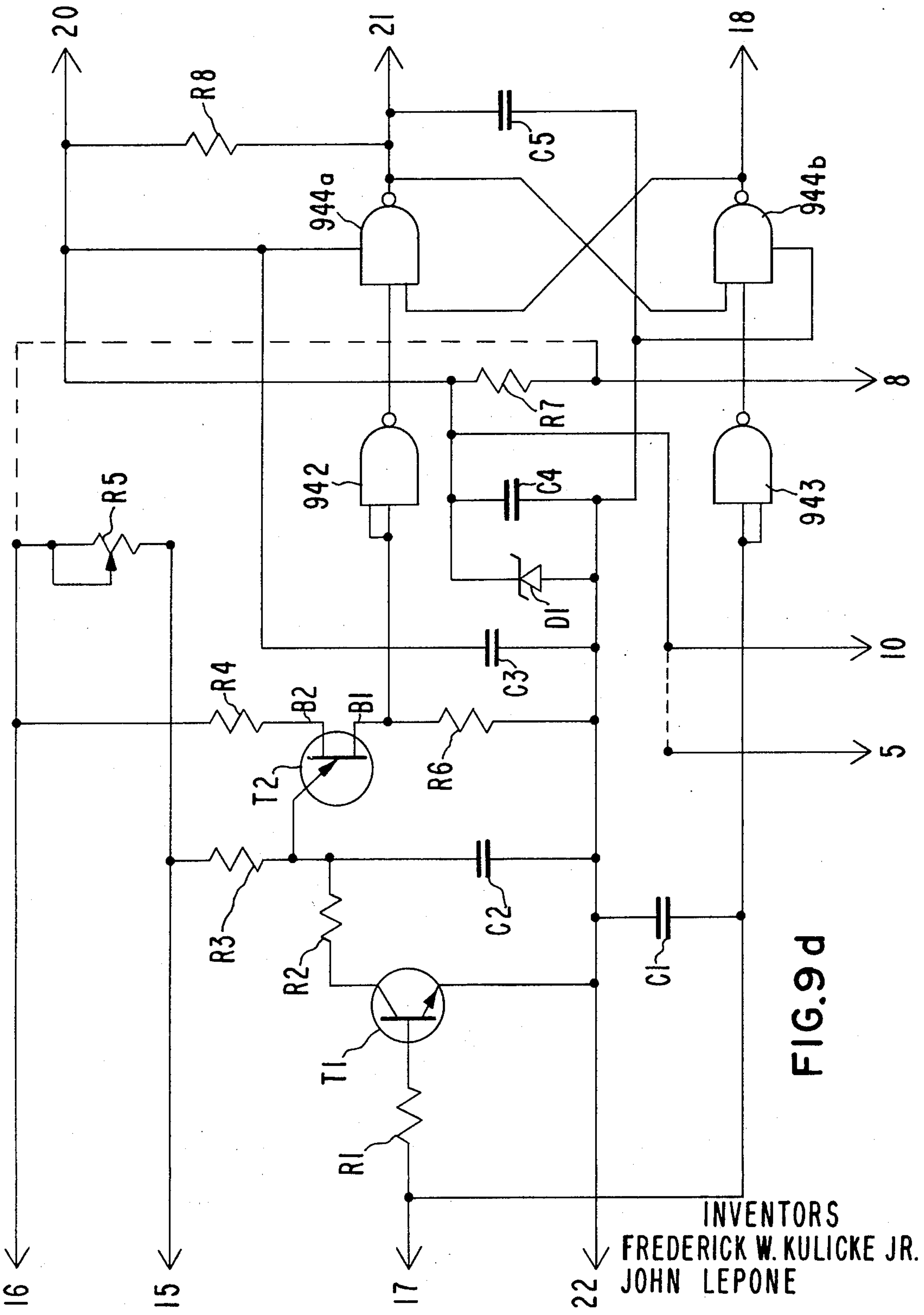

After the motor turns on, the slot allowing light from bulb 969 to fall on photodevice 967 is rotated out from between these two elements. Consequently, the resistance of photodevice 967 increases to a large value again thereby turning off transistor T4. The collector voltage on transistor T4 thus rises to a high level. This high level voltage is transmitted to pin 17 (FIG. 9d) of timer and voltage regulator circuit 940. There, this high level signal is inverted by inverting amplifier 943 and applied as a low level signal to one input lead of element 944*b*. This results in the output signal from element 944*b* switching from a low level to a high level. Applied to one input lead of element 944*a*, this high level output signal from element 944*b* results in the output signal from element 944*a* switching from high level to low level. This occurs, it should be noted, because the normal output signal from element 942 which is applied to the other input lead to element 944 *a* is a high level signal except when capacitor C2 discharges through transistor T2 and across resistor R6. Thus a low level signal is now applied through pin 15 on circuit 960 (FIG. 9*c*) to the base of transistor T5 turning off transistor T5. The turning off of transistor T5, however, does not cause a low level signal to be applied through pin 9 to relay 921 in power supply and motor control circuit 920. Rather, the high level collector voltage from transistor T4 turns on transistor T7 and results in a high level collector voltage being produced by transistor T8. This high level collector voltage is applied through pins 5 and 12 of preamp and driver circuit 960 to pin 9 of power supply and motor control circuit 920 thereby holding relay 921 on.

It should be noted that the motor remains on as long as transistor T8 conducts. Once the motor is shut off, however, it is turned on again by transistor T6 conducting in response to a shift in the level of output signal from element 944a. This shift occurs in response to the discharge of capacitor C2 through transistor T2 and across resistor R6. Once the motor is running and the slot in disc 313 has moved out from between light 969 in photodevice 967, the flip-flop consisting of elements 944*a* and 944*b* cannot be falsely triggered. Thus in most cases noise will not falsely stop the motor.

It should be noted that when the level of the output signal from element 944*a* switches from low to high, this high level signal is transmitted from timer and voltage regulator circuit 940 to preamp and driver circuit 960 only when the operator has button 134 pressed. Until button 134 is pressed, the motor will not turn on even though the built-in time delay in circuit 940 has expired.

FIG. 9*b* shows the power supply and motor control circuit 920. An 18 volt signal from transformer 912 (FIG. 9*a*) is transmitted on pins 21 and 20 to a rectifying circuit consisting of diodes D5 through D8 and capacitor C5. An A.C. signal is also transmitted through resistor R25 to lights 968 and 969 (FIG. 9*a*) to provide 5 volts across the filaments of these lights. Diode D9 prevents a reverse voltage from developing across relay 921.

When relay 921 is closed, contacts 921*c* and 921*d* short circuit the base and emitter of transistor T10 thereby holding this transistor off. Consequently, the base-emitter voltage of transistor T11 is held beneath the turn-on voltage and transistor T11 remains off, presenting a high impedance to the circuit. When contacts 921*a* and 921*b* separate, due to photodevice 967 receiving light, the triac switches from its low impedance to its high impedance state and thus current is no longer supplied to the main motor. The separation of contacts 921*c* and 921*d* allows braking current to flow from capacitor 983 to stop the motor. While the triac turns off, capacitor C8 charges. When transistor T10 turns on in response to the charging of capacitor C8 through resistors R29 and R30, the braking current from capacitor 983 turns off.

Capacitor 983 was charged through diode D10 and resistor R32 connected to lead 13 during the portions of each cycle that the 117 volt A.C. signal supplied on lead 14 went negative with respect to the voltage on lead 19 while the triac was in its low impedance state. When transistor T10 turns on, its emitter current passes through resistor R31 and thus increases the base voltage on transistor T11, turning on this transistor. The collector current of transistor T11 flows through diode D12 and through capacitor 984 and inductors 981 and 982, parts of the main drive motor. The emitter current of T11 then flows through capacitor 983 thereby discharging capacitor 983 and thus braking the main drive motor.

While structure for shutting off the motor twice each bonding cycle has been described, by changing the number of slots in disc 313 (FIG. 6*b*) the motor can be shut off a different number of times each bonding cycle, if desired.

What is claimed is:

1. Apparatus for placing semiconductor dice on bonding pads and bonding these dice to said bonding pads which comprises:

means for holding in a first horizontal plane a plurality of dice to be bonded to bonding pads;

means for picking up and transferring a die from said means for holding to a die bonding pad located in a second horizontal plane above said first horizontal plane on a support structure containing a multiplicity of bonding pads;

means, movable by an operator, for supporting said means for holding, said means for supporting being capable of being moved to properly position in sequence each die on said means for holding beneath said means for picking up and transferring;

means for indicating when each die is properly positioned beneath said means for picking up and transferring;

means for heating said support structure and its multiplicity of bonding pads;

means for moving the support structure along said means for heating so that each bonding pad on said support structure is sequentially in the proper location to receive a die brought from said means for holding by said means for picking up and transferring; and means for supplying power to said means for picking up and transferring and to said means for moving said support structure.

2. Structure as in claim 1 wherein said means for moving said support structure comprises means for moving a lead frame strip containing groups of leads held together by tie bars, all but a portion of each group of leads being held in a vertical plane by said means for moving, while said portion of each group of leads contains a bonding pad located in said second horizontal plane.

3. Apparatus for bonding semiconductor dice to bonding pads which comprises:

means for holding in a first horizontal plane a plurality of dice to be bonded to bonding pads;

means for picking up and transferring a die from said means for holding to a die bonding pad located in a second horizontal plane above said first horizontal plane on a support structure containing a multiplicity of bonding pads;

means, movable by an operator, for supporting said means for holding, said means for supporting being capable of being moved to properly position in sequence each die on said means for holding beneath said means for picking up and transferring;

means for indicating when each die is properly positioned beneath said means for picking up and transferring;

means for heating said support structure and its multiplicity of bonding pads;

means for moving the support structure along said means for heating so that each bonding pad on said support structure is sequentially in the proper location to receive a die brought from said means for holding by said means for picking up and transferring, said means for moving comprising:

index finger means;

means for periodically inserting said index finger means into, and withdrawing them from, said support structure;

means for moving said index finger means along said means for heating in one direction when said index finger means are inserted into said support structure and in the other direction when said index finger means are withdrawn from said support structure, thereby to properly position a bonding pad for the receipt of a die brought from said means for holding by said means for transferring; and means for supplying power to said means for picking up and transferring and to said means for moving said support structure.

4. Structure as in claim 3 wherein said means for moving includes:

means for pressing said support structure against said means for heating during the times said index fingers are withdrawn from said support structure.

5. Structure as in claim 4 wherein said means for picking up and transferring a die from said means for holding to a die bonding pad comprises:

two-ended support arm means, rotatably and slideably attached at one end on an air bearing to a vertical shaft;

die pick-up needle means slideably mounted in the other end of said arm so as periodically to contact a properly positioned die on said means for holding; and means for periodically applying a vacuum to said pick-up needle to allow said needle to draw said die from said means for holding.

6. Structure as in claim 5 wherein said means for supplying power to said means for picking up and transferring a die and to said means for moving said support structure comprises:

a motor;

a single drive shaft means driven by said motor;

five cam means rigidly mounted on said drive shaft means; and first linkage means driven by two of said cams for simultaneously rotating said means for picking up and transferring about said vertical shaft and lifting said means for picking up and transferring along said vertical shaft thereby to move said die from said means for holding to said bonding pad, said means for picking up and transferring substantially simultaneously following a vertical motion along, and a radial motion about, said shaft; and second linkage means connected to the remaining three of said cams for inserting and removing the index fingers into and from said support structure, for imparting reciprocal horizontal motion to said means for moving the support structure and for pressing said support structure against said means for heating while said means for picking up and transferring a die deposits a die on the proper bonding pad.

7. Structure as in claim 6 wherein said means for supplying power comprises:

means for periodically shutting off said motor for a given period of time a selected number of times each bonding cycle thereby to allow the bonding rate of said apparatus for bonding semiconductor dice to bonding pads to be adjusted according to operator proficiency.

8. Structure as in claim 1 wherein said means for indicating comprises:

means for supplying a light beam which intersects said first horizontal plane in a position directly beneath the position occupied by said means for picking up and transferring a die at the moment said means for picking up and transferring a die picks up a die from said means for holding; and means through which an operator can visually observe that a die on said means for holding is properly within said light beam prior to picking up and transferring said die from said means for holding to a bonding pad.

9. Structure as in claim 1 including in addition:

carrier means for containing a plurality of support structures to which dice are to be bonded.

10. Structure as in claim 9 including means for indexing said carrier means so as to align properly each support structure with said means for moving to allow said support structure to be transferred from said carrier means to said means for moving.

11. Structure as in claim 10 including second carrier means for receiving a plurality of support structures to which dice have been bonded after all bonding pads on each support structure have received dice.

12. Structure as in claim 11 including:

means for indexing said second carrier means so as to properly receive each support structure disgorged from said means for moving.

13. Structure as in claim 12 wherein said means for indexing said carrier means and said means for indexing said second carrier means each comprise:

a carrier deck driven by a tension spring in a selected direction perpendicular to said means for moving;

ratchet means containing teeth on a ratchet assembly on the bottom of said carrier deck;

first and second pawls containing pointed ends for engaging a given tooth on said ratchet means to hold said carrier deck in selected positions, the end of the second pawl being one-half tooth pitch in said direction from the end of the first pawl;

means, responsive to an operator, for disengaging the said first pawl from said ratchet means thereby allowing said tension spring to draw said carrier deck in said selected direction; and means for driving said second pawl to engage the tooth previously engaged by said first pawl after said carrier deck has travelled one-half tooth pitch from said first pawl in the direction of travel of said carrier deck, and when said operator releases said means for disengaging, for driving said first pawl to engage the next following ratchet tooth simultaneously disengaging said second pawl from said preceding ratchet tooth, thereby to allow said carrier deck to be drawn by said pre-tension spring one tooth pitch in said direction.

* * * * *